(12) United States Patent
Watarai et al.

(10) Patent No.: US 11,059,199 B2
(45) Date of Patent: Jul. 13, 2021

(54) RAW MATERIAL SUPPLY DEVICE AND SHEET MANUFACTURING APPARATUS

(71) Applicant: SEIKO EPSON CORPORATION, Tokyo (JP)

(72) Inventors: Yutaka Watarai, Matsumoto (JP); Toshiaki Yamagami, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 170 days.

(21) Appl. No.: 16/287,151

(22) Filed: Feb. 27, 2019

(65) Prior Publication Data
US 2019/0263018 A1 Aug. 29, 2019

(30) Foreign Application Priority Data
Feb. 28, 2018 (JP) .............................. JP2018-035880

(51) Int. Cl.
| | | |
|---|---|---|
| *B27N 3/04* | (2006.01) | |
| *D21B 1/08* | (2006.01) | |
| *D21B 1/10* | (2006.01) | |
| *D04H 1/732* | (2012.01) | |
| *B65H 3/44* | (2006.01) | |
| *D21G 9/00* | (2006.01) | |
| *B27N 3/00* | (2006.01) | |

(52) U.S. Cl.
CPC ............... *B27N 3/04* (2013.01); *B27N 3/007* (2013.01); *B65H 3/44* (2013.01); *D04H 1/732* (2013.01); *D21B 1/10* (2013.01); *D21G 9/0009* (2013.01); *D21B 1/08* (2013.01); *Y02W 30/64* (2015.05)

(58) Field of Classification Search
CPC . D21B 1/04; D21B 1/06; D21B 1/061; D21B 1/063; D21B 1/065; D21B 1/08; D21B 1/10; D21H 11/14; B27N 3/04; B27N 3/007; D04H 1/732; D04H 1/736
USPC ..................................... 162/4, 194, 261, 286
See application file for complete search history.

(56) References Cited

U.S. PATENT DOCUMENTS

| | | | |
|---|---|---|---|
| 4,812,205 A * | 3/1989 | Silveri | D21B 1/028 162/4 |
| 5,375,780 A | 12/1994 | Gray et al. | |
| 9,045,860 B2 | 6/2015 | Seki et al. | |
| 2014/0290890 A1* | 10/2014 | Seki | D21B 1/08 162/261 |

FOREIGN PATENT DOCUMENTS

| | | |
|---|---|---|
| CN | 1124049 A | 6/1996 |
| CN | 204170842 U | 2/2015 |
| CN | 105265065 A | 1/2016 |

(Continued)

*Primary Examiner* — Eric Hug
(74) *Attorney, Agent, or Firm* — Oliff PLC

(57) ABSTRACT

A raw material supply device includes a housing that stores an aggregate of small pieces, a discharge port through which the small pieces are discharged from an inside of the housing, a rotor provided in the housing and including a protruding portion, and a magnet provided on the discharge port or on a downstream side of the discharge port. In addition, it is preferable that the raw material supply device further include a passage route that communicates with the discharge port and through which the small pieces pass, in which at least one pair of the magnets is disposed on one side and the other side via the passage route.

12 Claims, 13 Drawing Sheets

(56) References Cited

FOREIGN PATENT DOCUMENTS

| CN | 205439348 U   | 8/2016  |
|----|---------------|---------|
| JP | 2006-104633 A | 4/2006  |
| JP | 2014-208926 A | 11/2014 |

\* cited by examiner

RAW MATERIAL SUPPLY DEVICE AND SHEET MANUFACTURING APPARATUS

BACKGROUND

1. Technical Field

The present invention relates to a raw material supply device and a sheet manufacturing apparatus.

2. Related Art

In the related years, as environmental awareness rises, it is required not only to reduce the amount of paper used in a workplace but also to recycle the paper in the workplace. As a system for recycling used paper, there is known a system including a crusher for crushing the used paper, and a sorter for sorting a crushed used paper and a metal piece (for example, staple of stapler) attached to the used paper (for example, refer to JP-A-2006-104633). In the system described in JP-A-2006-104633, the used paper from which the metal piece is removed can be recycled to a new paper.

The sorter of the system described in JP-A-2006-104633 includes a pipe passage through which the used paper in a state where the metal piece is adhered is introduced from a belt conveyor, and a plate magnet provided in the middle of the pipe passage. As a result, the metal piece can be sucked by the plate magnet in the process of the used paper passing through the pipe passage, and thereafter the used paper from which the metal piece is removed can be caused to flow down to the downstream side as it is.

However, in the system described in JP-A-2006-104633, for example, depending on the transport amount of used paper by the belt conveyor (amount of used paper to be fed to pipe passage), there is a possibility that the metal piece cannot be sufficiently attracted by the plate magnet. In this case, as the metal piece is mixed, the supply amount of the used paper as a whole to the downstream side of the sorter undesirably increases.

SUMMARY

An advantage of some aspects of the invention is to provide a raw material supply device and a sheet manufacturing apparatus capable of reducing variations (unevenness) in supply amount at the time of supplying small pieces.

The invention can be realized in the following aspects.

According to an aspect of the invention, a raw material supply device includes a housing that stores an aggregate of small pieces, a discharge port through which the small pieces are discharged from an inside of the housing, a rotor provided in the housing and including a protruding portion, and a magnet provided on the discharge port or on a downstream side of the discharge port.

Accordingly, even in a state where the metal piece is mixed in the aggregate of small pieces, for example, when the metal piece is discharged with the aggregate from the discharge port, the metal piece can be attracted to the magnet and can be adsorbed as it is. Accordingly, the aggregate flows downward in a state where mixing of the metal piece is prevented, and thus it is possible to prevent influence of the metal piece on the measurement of the weight of the small pieces, for example. Accordingly, it is possible to accurately measure the weight of the small pieces, and thus it is possible to suppress variations (unevenness) in the supply amount when supplying the small pieces.

It is preferable that the raw material supply device further include a passage route that communicates with the discharge port and through which the small pieces pass, in which at least one pair of the magnets is disposed on one side and the other side via the passage route.

Accordingly, when the metal piece mixed in the aggregate of small pieces passes through the passage route, the metal piece can be attracted to one of the magnets and adsorbed as it is.

In the raw material supply device, it is preferable that at least one pair of magnets be disposed side by side in a direction of rotation of the rotor.

Accordingly, the metal piece mixed in the aggregate of small pieces is easily adsorbed by the magnet which is as close as possible, and thus an adsorption rate with respect to the metal piece can be improved.

In the raw material supply device, it is preferable that at least one pair of magnets have different poles facing each other.

Accordingly, it is possible to regulate the direction of the magnetic lines of force, and thus the adsorption force to the metal piece mixed in the aggregate of small pieces increases. It is possible to sufficiently adsorb and capture the metal piece regardless of the amount of passage of the metal piece passing between the opposed magnets and the magnitude of the passage speed.

In the raw material supply device, it is preferable that the magnet form a magnet unit in which a plurality of the magnets are linearly arranged.

Accordingly, it is possible to ensure a wide range in which the adsorption force to the metal piece of the magnet unit exerts, and thus the metal piece is rapidly adsorbed by the magnet unit regardless of the passage position in the passage route.

In the raw material supply device, it is preferable that the same poles of the plurality of magnets be adjacent to each other in the magnet unit.

Accordingly, for example, it is possible to regulate the direction of magnetic lines of force in the magnet unit, and thus the adsorption force to the metal piece increases.

It is preferable that the raw material supply device further include a passage route that communicates with the discharge port and through which the small pieces pass, in which the small pieces freely fall in the passage route.

Accordingly, the falling speed in the passage route is suppressed as much as possible as compared with the case where the small pieces are forcibly sucked downward and fell. Accordingly, it is possible to ensure the time during which the small pieces pass in front of the magnet as long as possible, and thus the adsorption to the small pieces by the magnet can be sufficiently performed.

It is preferable that the raw material supply device further include a transport portion provided on a downstream side of the passage route and that transports the small pieces accumulated thereon.

Accordingly, for example, the small pieces discharged from the discharge port can be transported toward a measuring portion for weighing the aggregate of the small pieces.

In the raw material supply device, it is preferable that the transport portion include a vibration applying portion that applies vibration to the small pieces, and transports the small pieces by the vibration.

Accordingly, for example, the configuration of the transport portion can be simplified as compared with the case where the transport portion can be transported by a belt.

It is preferable that the raw material supply device further include an accommodation portion having a bottom portion in a direction vertically downward of the discharge port, in which the bottom portion can be opened and closed according to a weight of the small pieces accommodated in the accommodation portion.

Accordingly, in a state where the mixing of metal piece is reduced, the weight of the small pieces are measured and quantitative supply becomes possible. In addition, as compared with the case where the transport portion can be transported by the belt, the size of the apparatus can be reduced.

In the raw material supply device, it is preferable that the discharge port be provided at a position eccentric from a rotation center of the rotor.

Accordingly, the small pieces can rotate with the rotor, and thus centrifugal force acts on the small pieces. Therefore, when the discharge port is provided at such a position as described above, the small pieces can easily reach the discharge port.

It is preferable that the raw material supply device further include a shredding portion that shreds a used paper to obtain the small pieces.

Accordingly, for example, the used paper has a size enough to be weighed in the measuring portion, and thus accurate weighing is performed.

According to another aspect of the invention, a sheet manufacturing apparatus includes the raw material supply device according to the invention, in which a sheet is manufactured using the small pieces supplied from the raw material supply device as a raw material.

Accordingly, even in a state where the metal piece is mixed in the aggregate of small pieces, for example, when the metal piece is discharged with the aggregate from the discharge port, the metal piece can be attracted to the magnet and can be adsorbed as it is. Accordingly, the aggregate flows downward in a state where mixing of the metal piece is prevented, and thus it is possible to prevent influence of the metal piece on the measurement of the weight of the small pieces, for example. Accordingly, it is possible to accurately measure the weight of the small pieces, and thus it is possible to suppress variations (unevenness) in the supply amount when supplying the small pieces. With the sheet manufacturing apparatus, for example, a sheet having uniform thickness, density, and the like can be stably manufactured.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a raw material supply device and a sheet manufacturing apparatus of the invention will be described in detail based on preferred embodiments shown in the accompanying drawings.

First Embodiment

Figure 1:
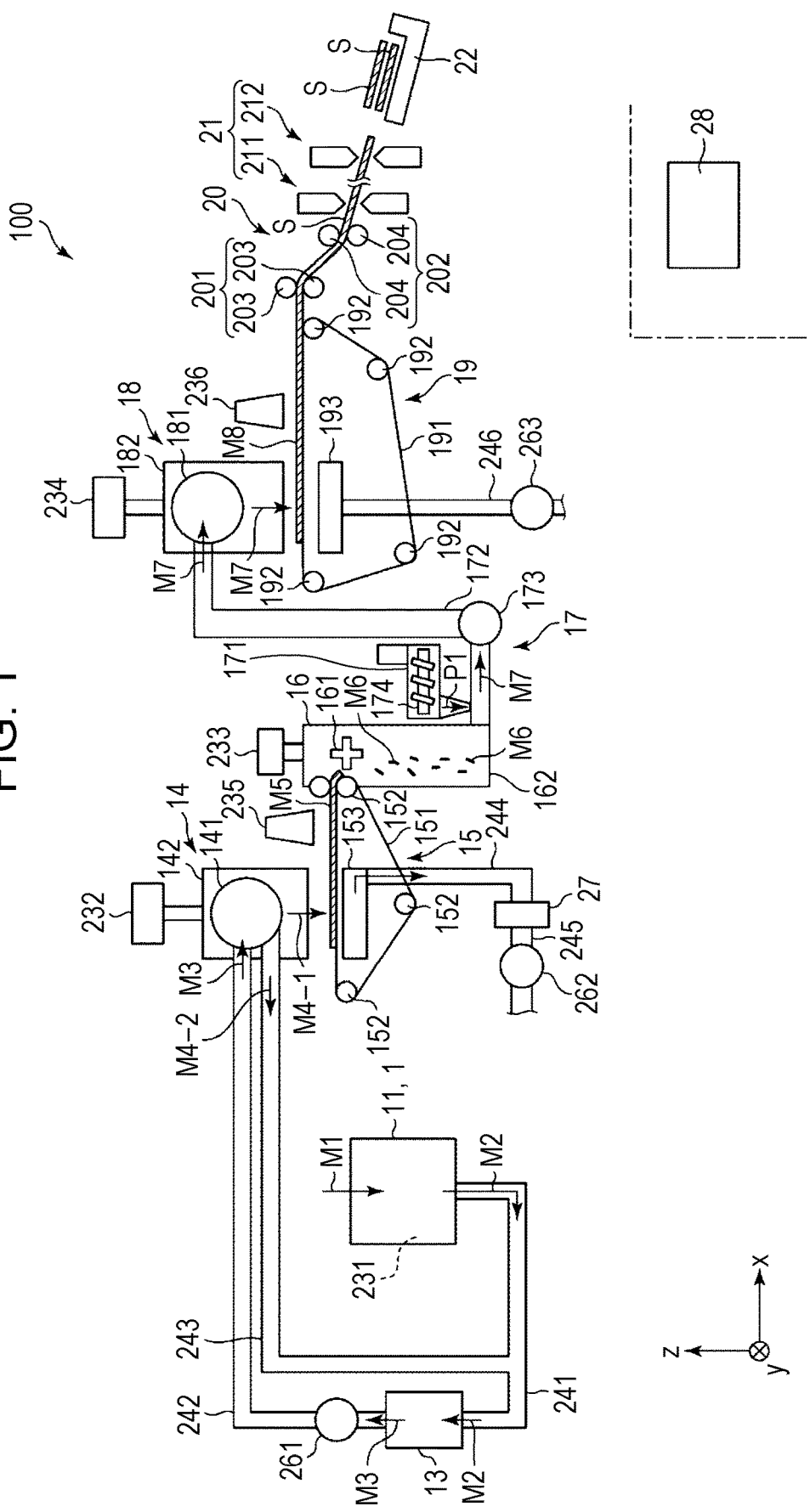
FIG. 1 is a schematic side view showing a sheet manufacturing apparatus (first embodiment) of the invention.
Figure 2:
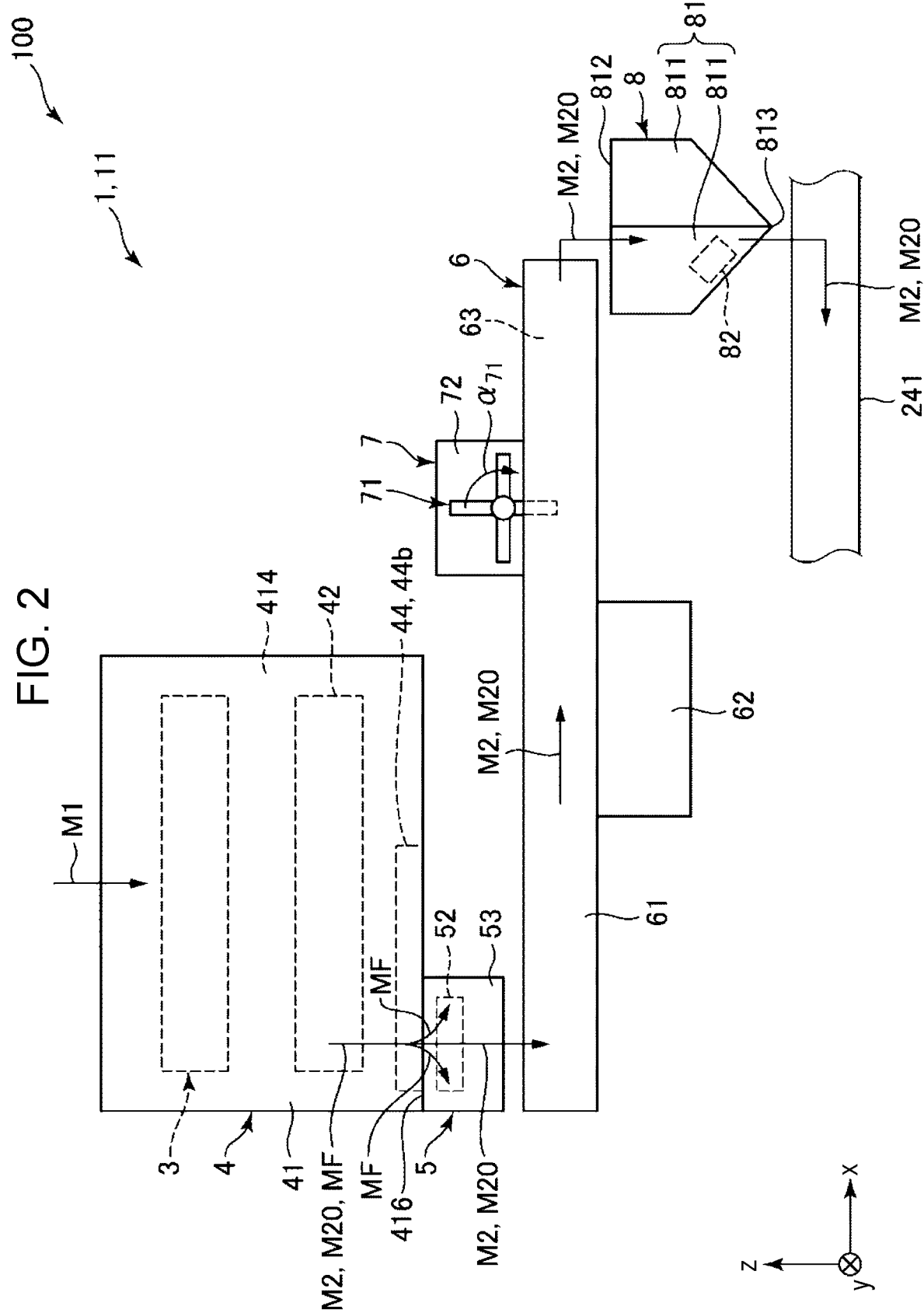
FIG. 2 is a schematic side view showing a raw material supply device provided in the sheet manufacturing apparatus shown in FIG. 1.
Figure 3:
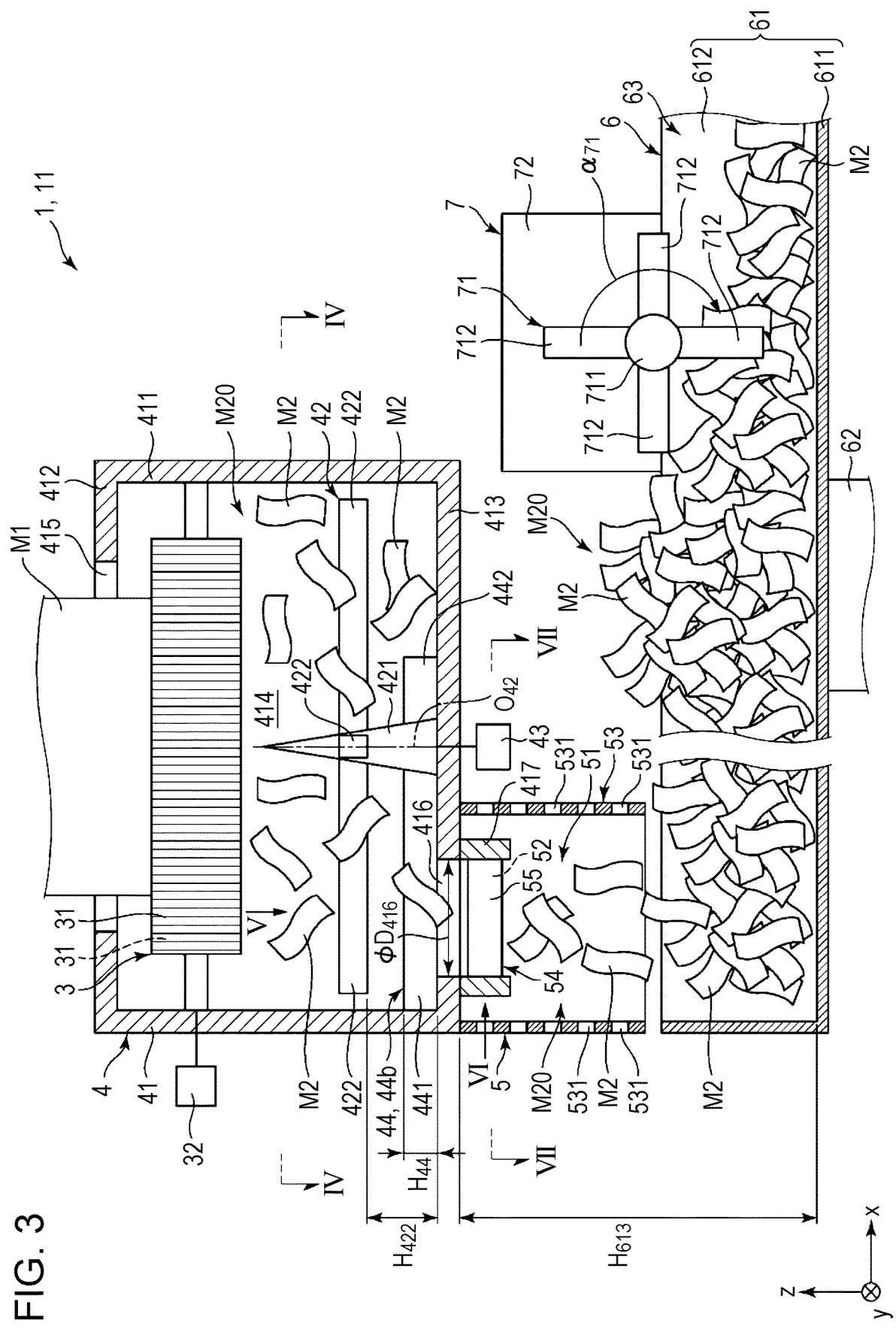
FIG. 3 is a partial vertical cross-sectional view showing a configuration on an upstream side of the raw material supply device in FIG. 2.
Figure 4:
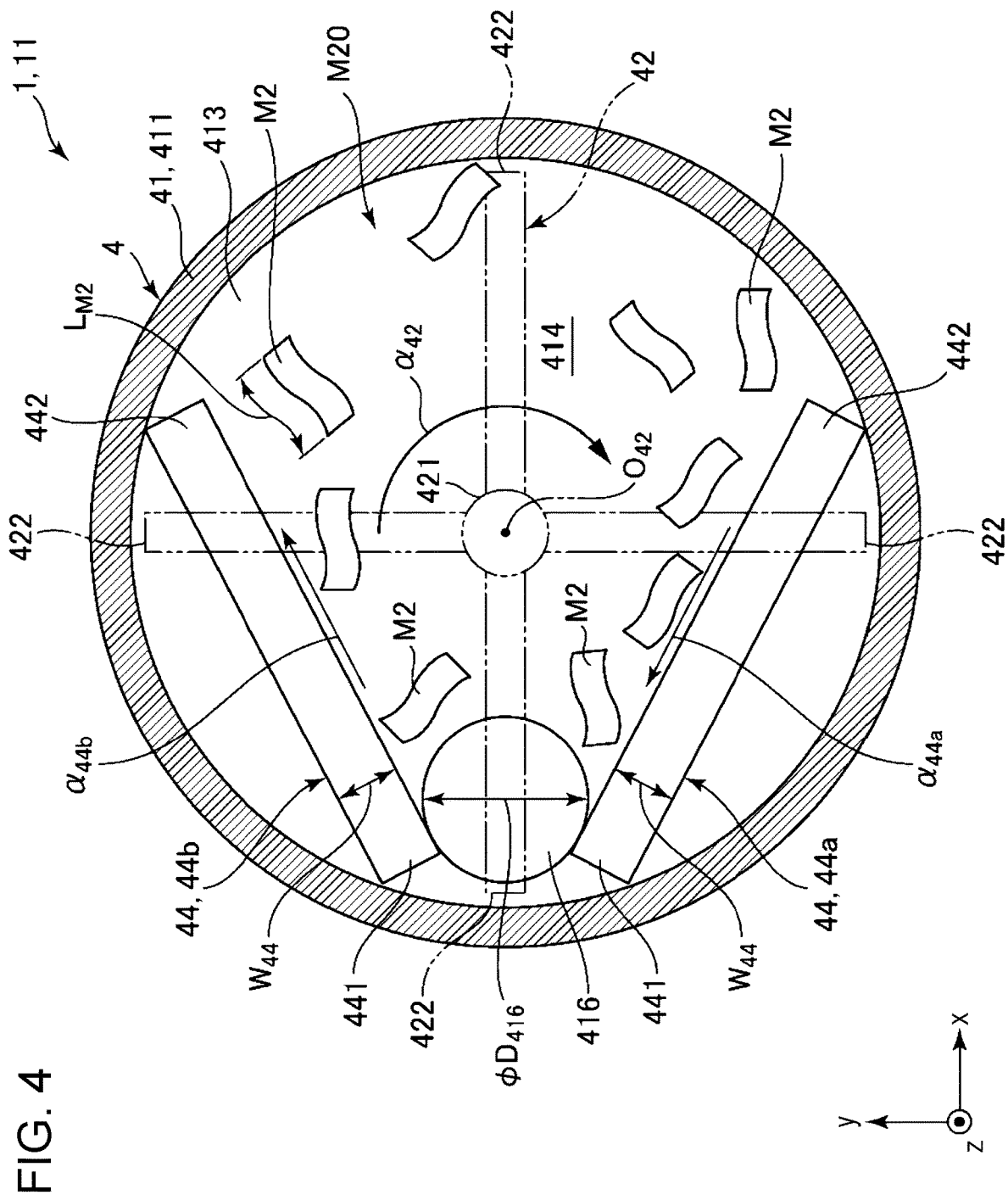
FIG. 4 is a cross-sectional view taken along line IV-IV in FIG. 3.
Figure 5:
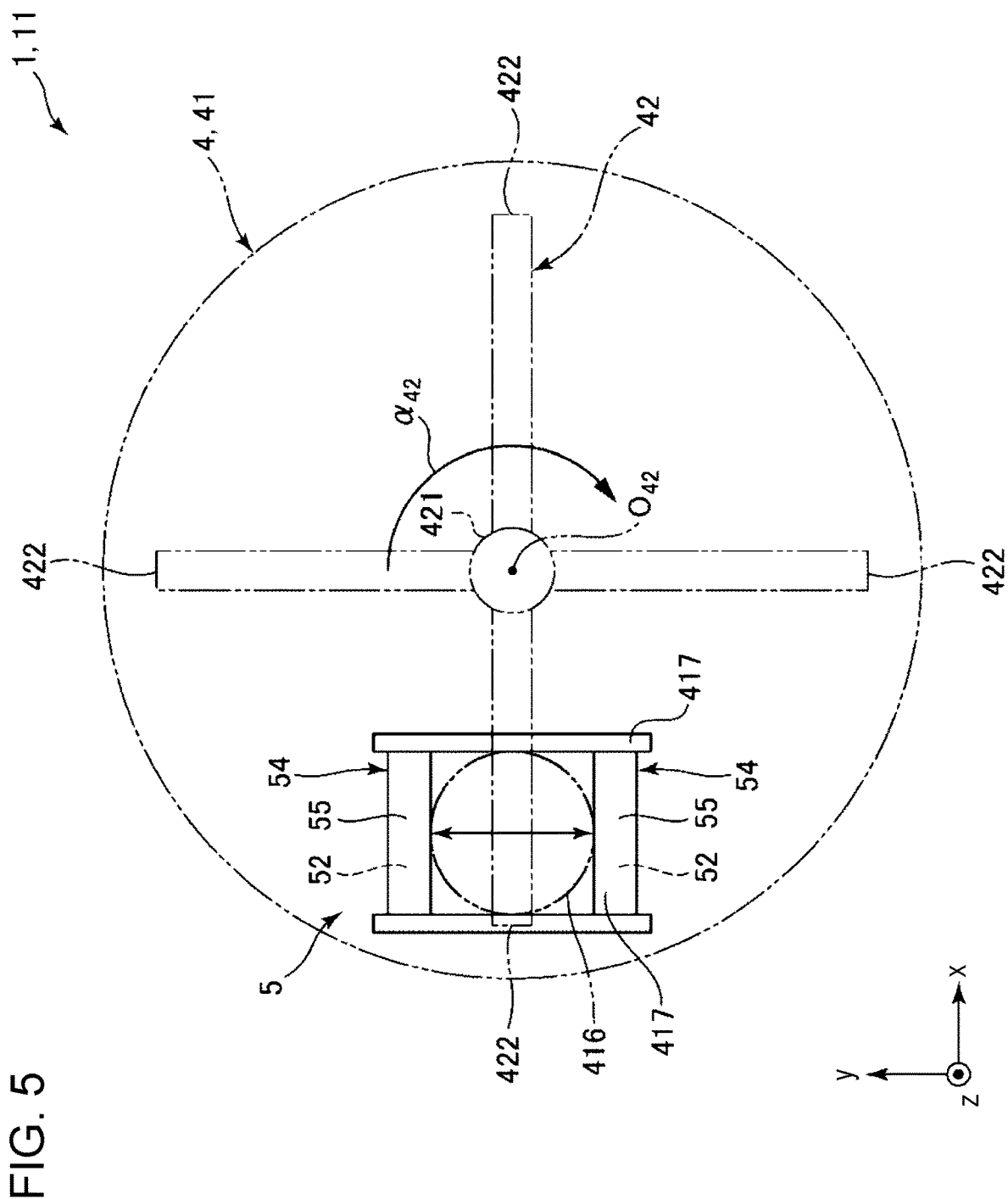
FIG. 5 is a view (plan view) seen from a direction of an arrow V in FIG. 3.
Figure 6:
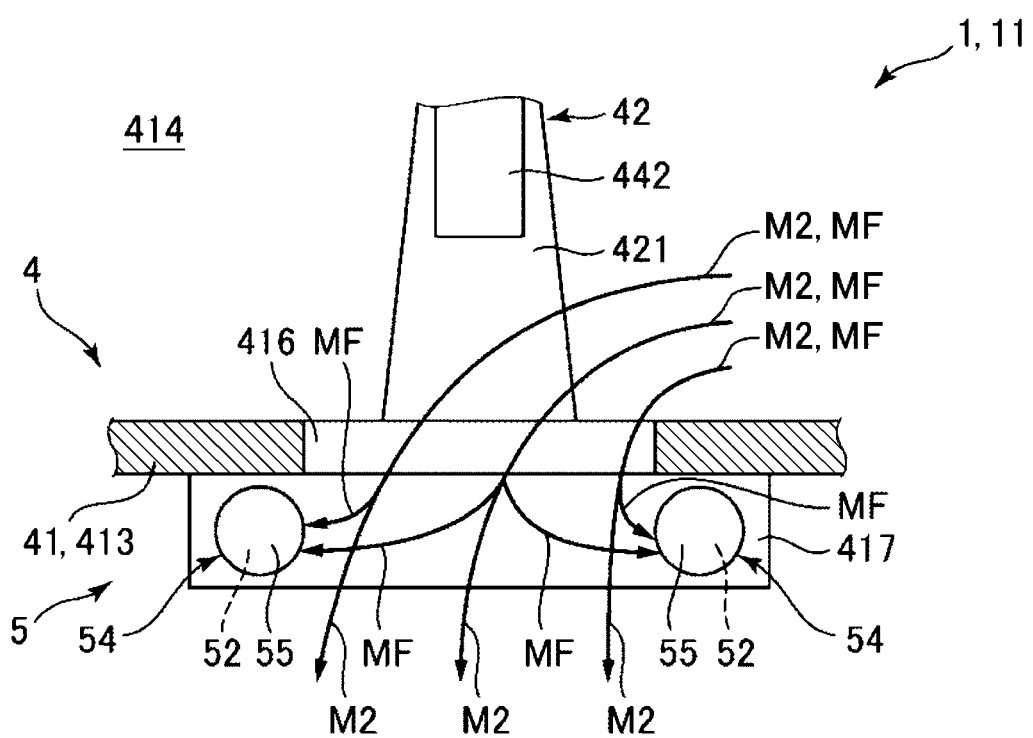
FIG. 6 is a view (partial cross-sectional view) seen from a direction of an arrow VI in FIG. 3.
Figure 7:
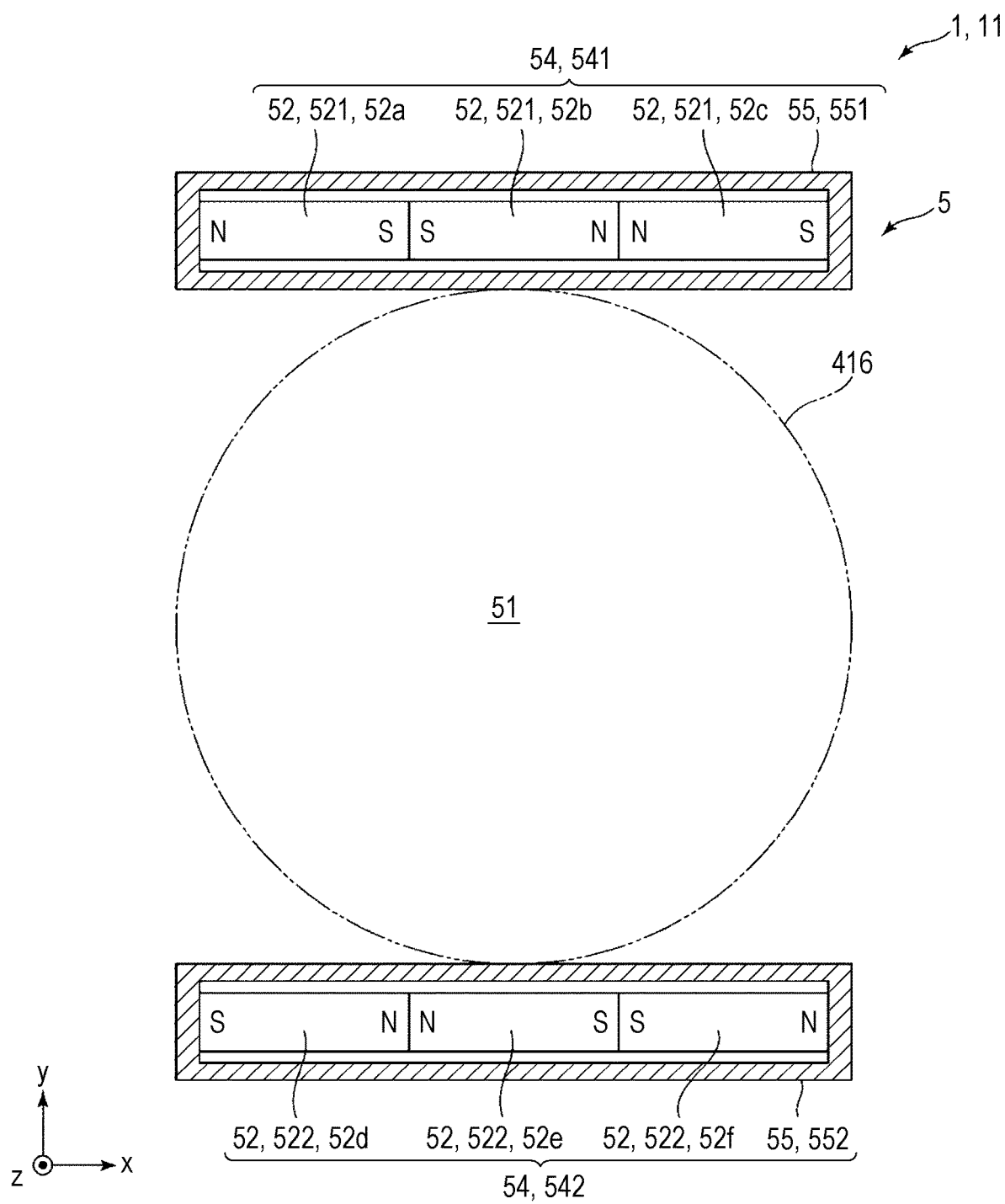
FIG. 7 is a cross-sectional view taken along line VII-VII in FIG. 3.

FIG. 1 is a schematic side view showing a sheet manufacturing apparatus (first embodiment) of the invention. FIG. 2 is a schematic side view showing a raw material supply device provided in the sheet manufacturing apparatus shown in FIG. 1. FIG. 3 is a partial vertical cross-sectional view showing a configuration on an upstream side of the raw material supply device in FIG. 2. FIG. 4 is a cross-sectional view taken along line IV-IV in FIG. 3. FIG. 5 is a view (plan view) seen from a direction of an arrow V in FIG. 3. FIG. 6 is a view (partial cross-sectional view) seen from a direction of an arrow VI in FIG. 3. FIG. 7 is a cross-sectional view taken along line VII-VII in FIG. 3. Hereinafter, for convenience of description, as shown in FIG. 1, three axes orthogonal to each other are an x axis, a y axis, and a z axis. In addition, the xy plane including the x axis and the y axis is horizontal and the z axis is vertical. In addition, a direction where an arrow of each axis points is referred to as "positive" and an opposite direction is referred to as "negative". In addition, upper sides in FIGS. 1 to 3, and 6 (similar to FIGS. 9 to 13) may be referred to as "upper" or "upward", and lower sides is referred to as "lower" or "downward".

A raw material supply device 1 of the invention includes a housing 41 for storing an aggregate M20 of coarse crushed pieces (small pieces) M2 therein, a discharge port 416 through which the coarse crushed pieces (small pieces) M2 is discharged from an inside of the housing 41, a rotor 42 provided in the housing 41 and including a protruding portion 422, and a magnet 52 provided on the discharge port 416 or on a downstream side of the discharge port 416.

According to such an invention, as described later, even in a state where a metal piece MF is mixed in the aggregate M20, when the metal piece MF is discharged with the aggregate M20 from the discharge port 416, the metal piece MF can be drawn to the magnet 52 and adsorbed as it is. As a result, the coarse crushed pieces M2 (aggregate M20) flow downward in a state where mixing of the metal piece MF is prevented, and thus, for example, it is possible to prevent influence of the metal piece MF on the measurement of the weight of the coarse crushed pieces M2. As a result, it is possible to accurately measure the weight of the coarse crushed pieces M2, and thus, when the coarse crushed pieces M2 is supplied, it is possible to suppress variation (unevenness) in the supply amount and to maintain the supply amount to a constant supply amount. The target supply amount of the coarse crushed pieces M2 can be appropriately set (adjusted), for example, by adjusting operating conditions of a shredding portion 3, the rotor 42, and the like described later. In addition, in the embodiment, although the small pieces (coarse crushed pieces M2) are pieces obtained by shredding the paper containing used paper by a shredder (shredding portion 3), the small pieces in the raw material supply device 1 of the invention are not limited to the small pieces of paper (especially used paper), and small pieces of plastic, metal or the like not attracted by the magnet 52 can be applied, for example.

The sheet manufacturing apparatus 100 of the invention includes the raw material supply device 1 and manufactures a sheet S using the coarse crushed pieces (small pieces) M2 supplied from the raw material supply device 1 as a raw material.

As a result, the sheet manufacturing apparatus 100 having the advantage of the raw material supply device 1 described above is obtained. By the sheet manufacturing apparatus 100, for example, it is possible to stably manufacture the sheet S having uniform thickness, density, and the like.

As shown in FIG. 1, the sheet manufacturing apparatus 100 is provided with a raw material supply portion 11 using the raw material supply device 1 of the invention, a defibrating portion 13, a sorting portion 14, a first web forming portion 15, a subdividing portion 16, a mixing portion 17, a loosening portion 18, a second web forming portion 19, a sheet forming portion 20, a cutting portion 21, a stock portion 22, and a collecting portion 27. In the embodiment, the raw material supply portion 11 is configured to include the raw material supply device 1. In addition, the sheet manufacturing apparatus 100 is provided with a humidifying portion 231, a humidifying portion 232, a humidifying portion 233, a humidifying portion 234, a humidifying portion 235, and a humidifying portion 236. In addition, the sheet manufacturing apparatus 100 is provided with a blower 261, a blower 262, and a blower 263.

The operation of each part of the raw material supply portion 11 (raw material supply device 1) provided in the sheet manufacturing apparatus 100, and the like is controlled by a control unit 28. In addition, the control unit 28 may be built in the sheet manufacturing apparatus 100 or may be provided in an external device such as an external computer. For example, the external device may be communicated with the sheet manufacturing apparatus 100 via a cable or the like, may be communicated by wireless communication, or may be connected to the sheet manufacturing apparatus 100 via a network (for example, the Internet).

In addition, in the sheet manufacturing apparatus 100, a raw material supply step, a defibrating step, a sorting step, a first web forming step, a dividing step, a mixing step, a loosening step, a second web forming step, a sheet forming step, and a cutting step are performed in this order to obtain a sheet S.

Hereinafter, the configuration of each part will be described.

The raw material supply portion 11 is a portion that performs the raw material supply step of supplying a raw material M1 to the defibrating portion 13. This raw material M1 is a sheet-like material including a fiber (cellulose fiber). The cellulose fiber is not limited as long as it is fibrous mainly formed of cellulose (narrowly defined cellulose) as a compound, and may contain hemicellulose and lignin in addition to cellulose (narrowly defined cellulose). In addition, the raw material M1 may be woven fabric, nonwoven fabric, or the like in any form. In addition, the raw material M1 may be, for example, recycled paper produced (recycled) by defibrating a used paper, Yupo paper (registered trademark) of synthetic paper, or may not be recycled paper. As shown in FIG. 3, in the embodiment, the raw material M1 is the used paper (sheet). As will be described later, the raw material M1 is crushed in the raw material supply portion 11 (raw material supply device 1) to be coarse crushed pieces (small pieces) M2. The coarse crushed pieces (small pieces) M2 are further sent to the defibrating portion 13 on the downstream side.

Inside the raw material supply portion 11, the humidifying portion 231 is disposed (refer to FIG. 1). The humidifying portion 231 humidifies the coarse crushed pieces M2 in the raw material supply portion 11. The humidifying portion 231 has a filter (not shown) containing moisture, and is formed of a vaporization type (or warm air vaporization type) humidifier which supplies humidified air having increased humidity to the coarse crushed pieces M2 by allowing air to pass through the filter. By supplying the humidified air to the coarse crushed pieces M2, it is possible to inhibit the adhesion of the coarse crushed pieces M2 to the inside of the raw material supply portion 11 or the like due to static electricity.

The raw material supply portion 11 is connected to the defibrating portion 13 via a pipe (flow path) 241. The coarse crushed pieces M2 passes through the pipe 241 and is transported to the defibrating portion 13.

The defibrating portion 13 is a portion that performs a defibrating step of defibrating the coarse crushed pieces M2 in the atmosphere such as air (in air), that is, in a dry manner. By the defibrating processing at the defibrating portion 13, a defibrated material M3 can be generated from the coarse crushed pieces M2. Here, "to defibrate" refers to unravel the coarse crushed pieces M2 formed by binding a plurality of fibers to each fiber one by one. This unraveled material is the defibrated material M3. The shape of the defibrated material M3 is a linear shape or a belt shape. In addition, the defibrated material M3 may exist in a state of being intertwined to form a lump, that is, in a state of forming a so-called "Dama" (lump).

In the embodiment, for example, the defibrating portion 13 is formed of an impeller mill having a rotor rotating at high speed and a liner positioned on an outer periphery of the rotor. The raw material M1 (used sheet) coarsely crushed by the shredding portion 3, that is, the coarse crushed pieces M2 flow into the defibrating portion 13. Thereafter, the coarse crushed pieces M2 are interposed between the rotor and the liner and defibrated to be the defibrated material M3.

In addition, the defibrating portion 13 can generate a flow of air (air flow) from raw material supply portion 11 to the sorting portion 14 by the rotation of the rotor. As a result, the coarse crushed pieces M2 can be sucked from the pipe 241 to the defibrating portion 13. In addition, after the defibrating processing, the defibrated material M3 can be sent out to the sorting portion 14 via a pipe 242.

A blower 261 is installed in the middle of the pipe 242. The blower 261 is an air flow generating device that generates an air flow toward the sorting portion 14. As a result, the delivery of the defibrated material M3 to the sorting portion 14 is promoted.

The sorting portion 14 performs the sorting step of sorting the defibrated material M3 according to the length of the fiber. In the sorting portion 14, the defibrated material M3 is sorted into a first sorted object M4-1 and a second sorted object M4-2 larger than the first sorted object M4-1. The first sorted object M4-1 has a size suitable for the subsequent manufacture of the sheet S. The average length is preferably 1 µm or more and 30 µm or less. On the other hand, the second sorted object M4-2 includes, for example, those insufficiently defibrated, those in which the defibrated fibers are aggregated excessively, and the like.

The sorting portion 14 has a drum portion 141 and a housing portion 142 that houses the drum portion 141.

The drum portion 141 is formed of a porous body and is a sieve that rotates about the central axis. The defibrated material M3 flows into the drum portion 141. As the drum portion 141 rotates, the defibrated material M3 smaller than a sieve opening is sorted as a first sorted object M4-1, and the defibrated material M3 larger than the mesh opening is sorted as a second sorted object M4-2.

The first sorted object M4-1 falls from the drum portion 141.

On the other hand, the second sorted object M4-2 is sent out to a pipe (flow path) 243 connected to the drum portion 141. The pipe 243 is connected to the pipe 241 on the side (downstream side) opposite to the drum portion 141. The second sorted object M4-2 passed through the pipe 243 joins the coarse crushed pieces M2 in the pipe 241 and flows into the defibrating portion 13 with the coarse crushed pieces M2. As a result, the second sorted object M4-2 is returned to the defibrating portion 13 and is subjected to the defibrating processing with the coarse crushed pieces M2.

In addition, the first sorted object M4-1 from the drum portion 141 falls while dispersing in the air and heads toward the first web forming portion (separation portion) 15 located below the drum portion 141. The first web forming portion 15 is a portion for performing the first web forming step of forming a first web M5 from the first sorted object M4-1. The first web forming portion 15 has a mesh belt (separation belt) 151, three stretching rollers 152, and a suction portion (suction mechanism) 153.

The mesh belt 151 is an endless belt, and the first sorted object M4-1 is accumulated. The mesh belt 151 is wrapped around three stretching rollers 152. By rotationally driving the stretching roller 152, the first sorted object M4-1 on the mesh belt 151 is transported to the downstream side.

The first sorted object M4-1 is larger than the mesh opening of the mesh belt 151. As a result, the first sorted object M4-1 is restricted from passing through the mesh belt 151, and thus can be accumulated on the mesh belt 151. In addition, since the first sorted object M4-1 is accumulated on the mesh belt 151 while being transported to the downstream side with the mesh belt 151, the first sorted object M4-1 is formed as a layered first web M5.

In addition, for example, there is a possibility that dirt, dust, paper powder, and the like may be mixed in the first sorted object M4-1. The dirt and dust may be generated, for example, by coarsely crushing or defibrating. Such dirt, dust, and paper powder are collected in the collecting portion 27 described later.

The suction portion 153 can suck air from below the mesh belt 151. As a result, the dirt dust, and paper powder passed through the mesh belt 151 can be sucked with air.

In addition, the suction portion 153 is connected to the collecting portion 27 via a pipe (flow path) 244. The dirt, dust, and paper powder sucked by the suction portion 153 is collected in the collecting portion 27.

A pipe (flow path) 245 is further connected to the collecting portion 27. In addition, a blower 262 is installed in the middle of the pipe 245. By the operation of the blower 262, suction force can be generated by the suction portion 153. As a result, formation of the first web M5 on the mesh belt 151 is promoted. The first web M5 is obtained by removing the dirt, dust, paper powder, and the like. In addition, the dirt, dust, and paper powder reach the collecting portion 27 after passing through the pipe 244 by operation of the blower 262.

The housing portion 142 is connected to the humidifying portion 232. The humidifying portion 232 is formed of a vaporization type humidifier similar to the humidifying portion 231. As a result, humidified air is supplied into the housing portion 142. By this humidified air, it is possible to humidify the first sorted object M4-1, and thus it is possible to inhibit the first sorted object M4-1 from adhering to an inner wall of the housing portion 142 due to electrostatic force.

On the downstream side of the sorting portion 14, the humidifying portion 235 is disposed. The humidifying portion 235 is formed of an ultrasonic humidifier for spraying water. As a result, moisture can be supplied to the first web M5, and thus the moisture content of the first web M5 is adjusted. By this adjustment, the first web M5 can be inhibited from adsorbing to the mesh belt 151 due to electrostatic force. As a result, the first web M5 is easily separated from the mesh belt 151 at a position where the mesh belt 151 is folded back by the stretching roller 152.

On the downstream side of the humidifying portion 235, the subdividing portion 16 is disposed. The subdividing portion 16 is a portion that performs the dividing step of dividing the first web M5 separated from the mesh belt 151. The subdividing portion 16 has a propeller 161 rotatably supported and a housing portion 162 housing the propeller 161. By the rotating propeller 161, it is possible to divide the first web M5. The divided first web M5 becomes a subdivided body M6.

The housing portion 162 is connected to the humidifying portion 233. The humidifying portion 233 is formed of a vaporization type humidifier similar to the humidifying portion 231. As a result, humidified air is supplied into the housing portion 162. By this humidified air, it is also possible to prevent the subdivided body M6 from adhering to the inner wall of the propeller 161 and the housing portion 162 due to electrostatic force.

On the downstream side of the subdividing portion 16, the mixing portion 17 is disposed. The mixing portion 17 is a portion that performs the mixing step of mixing the subdivided body M6 and a resin P1. The mixing portion 17 includes a resin supply portion 171, a pipe (flow path) 172, and a blower 173.

The pipe 172 connects the housing portion 162 of the subdividing portion 16 and a housing portion 182 of the loosening portion 18, and is a flow path through which a mixture M7 of the subdivided body M6 and the resin P1 passes.

The resin supply portion 171 is connected to the middle of the pipe 172. The resin supply portion 171 has a screw feeder 174. By rotationally driving the screw feeder 174, it is possible to supply the resin P1 as a powder or particles to the pipe 172. The resin P1 supplied to the pipe 172 is mixed with the subdivided body M6 to be the mixture M7.

The resin P1 bonds the fibers to each other in a later step. For example, a thermoplastic resin, a curable resin, or the like can be used, and a thermoplastic resin is preferably used. Examples of thermoplastic resin include polyolefin such as AS resin, ABS resin, polyethylene, polypropylene, ethylene-vinyl acetate copolymer (EVA), acrylic resins such as modified polyolefins, polymethyl methacrylate, polyester such as polyvinyl chloride, polystyrene, polyethylene terephthalate, polybutylene terephthalate, polyamides (nylon) such as nylon 6, nylon 46, nylon 66, nylon 610, nylon 612, nylon 11, nylon 12, nylon 6-12, nylon 6-66, liquid crystal polymers such as polyphenylene ether, polyacetal, polyether, polyphenylene oxide, polyether ether ketone, polycarbonate, polyphenylene sulfide, thermoplastic polyimide, polyetherimide, aromatic polyester, various thermoplastic elastomers such as styrene type, polyolefin type, polyvinyl chloride type, polyurethane type, polyester type, polyamide type, polybutadiene type, trans polyisoprene type, fluoro rubber type, chlorinated polyethylene type, and the like. One type or two or more types selected from these can be used in combination. Preferably, as the thermoplastic resin, a polyester or a resin containing polyester is used.

As a material supplied from the resin supply portion 171, for example, a coloring agent for coloring the fibers, an aggregation inhibitor for inhibiting aggregation of the fibers or aggregation of the resin P1, a flame retardant for making the fibers less susceptible to burning, a paper strength enhancer for enhancing the paper strength of the sheet S, and the like may be included, in addition to the resin P1. Alternatively, a material in which these materials are previously contained (compounded) in the resin P1 may be supplied from the resin supply portion 171.

In addition, the blower 173 is installed on the downstream side of the resin supply portion 171 in the pipe 172. The subdivided body M6 and the resin P1 are mixed by the action of the rotating portion such as the blades of the blower 173. In addition, the blower 173 can generate the air flow towards the loosening portion 18. With this air flow, the subdivided body M6 and the resin P1 can be agitated in the pipe 172. As a result, the mixture M7 can flow into the loosening portion 18 in a state where the subdivided body M6 and the resin P1 are uniformly dispersed. In addition, the subdivided body M6 in the mixture M7 is loosened in the process of passing through the inside of the pipe 172, and becomes finer fibrous.

The loosening portion 18 is a portion for performing the loosening step of loosening the mutually entangled fibers in the mixture M7. The loosening portion 18 has a drum portion 181 and a housing portion 182 for housing the drum portion 181.

The drum portion 181 is formed of a porous body having a cylindrical shape and is a sieve rotating around the central axis. The mixture M7 flows into the drum portion 181. As the drum portion 181 rotates, fibers or the like smaller than the sieve opening of the mixture M7 can pass through the drum portion 181. At that time, the mixture M7 is loosened. The sieve opening of the drum portion 181 is equal to or larger than the sieve opening of the drum portion 141. As a result, the mixture M7 can be loosened and passed.

In addition, the mixture M7 loosened by the drum portion 181 falls while dispersing in the air and heads toward the second web forming portion 19 located below the drum portion 181. The second web forming portion 19 is a portion for performing the second web forming step of forming a second web M8 from the mixture M7. The second web forming portion 19 includes a mesh belt (separation belt) 191, a stretching roller 192, and a suction portion (suction mechanism) 193.

The mesh belt 191 is an endless belt, and the mixture M7 is accumulated. The mesh belt 191 is wrapped around four stretching rollers 192. By rotationally driving the stretching roller 192, the mixture M7 on the mesh belt 191 is transported to the downstream side.

In addition, most of the mixture M7 on the mesh belt 191 is larger than the mesh opening of the mesh belt 191. As a result, the mixture M7 is restricted from passing through the mesh belt 191, and thus can be accumulated on the mesh belt 191. In addition, since the mixture M7 is accumulated on the mesh belt 191 while being transported to the downstream side with the mesh belt 191, the mixture M7 is formed as the layered second web M8.

The suction portion 193 can suck air from below the mesh belt 191. As a result, the mixture M7 can be sucked onto the mesh belt 191, and thus the accumulation of the mixture M7 is promoted on the mesh belt 191.

A pipe (flow path) 246 is connected to the suction portion 193. In addition, a blower 263 is installed in the middle of the pipe 246. By the operation of the blower 263, suction force can be generated by the suction portion 193.

Each of the pipe 241, the pipe 242, the pipe 243, the pipe 244, the pipe 245, the pipe 246, and the pipe 172 may be configured to include a single pipe or a connecting pipe connecting a plurality of pipes.

The housing portion 182 is connected to the humidifying portion 234. The humidifying portion 234 is formed of a vaporization type humidifier similar to the humidifying portion 231. As a result, humidified air is supplied into the housing portion 182. By this humidified air, it is possible to humidify the interior of the housing portion 182, and thus it is possible to inhibit the mixture M7 from adhering to the inner wall of the housing portion 182 due to electrostatic force.

On the downstream side of the loosening portion 18, the humidifying portion 236 is disposed. The humidifying portion 236 is formed of an ultrasonic humidifier similar to the humidifying portion 235. As a result, moisture can be supplied to the second web M8, and thus the moisture content of the second web M8 is adjusted. By this adjustment, the second web M8 can be inhibited from absorbing onto the mesh belt 191 due to electrostatic force. As a result, the second web M8 is easily separated from the mesh belt 191 at a position where the mesh belt 191 is folded back by the stretching roller 192.

The moisture amount (total moisture amount) applied to the humidifying portions 231 to 236 is, for example, preferably 0.5 parts by mass or more and 20 parts by mass or less with respect to 100 parts by mass of the material before humidification.

On the downstream side of the second web forming portion 19, the sheet forming portion 20 is disposed. The sheet forming portion 20 is a portion for performing the sheet forming step of forming the sheet S from the second web M8. The sheet forming portion 20 includes a pressurizing portion 201 and a heating portion 202. The second web M8 is one in which the defibrated material M3 undergoes each step on the upstream side of the sheet forming step and naturally contains the defibrated material M3.

The pressurizing portion 201 has a pair of calender rollers 203, and can apply pressure without heating the second web M8 between the calender rollers 203 (without melting resin P1). As a result, the density of the second web M8 is increased. The second web M8 is transported toward the heating portion 202. One of the pair of calender rollers 203 is a main driving roller driven by the operation of a motor (not shown), and the other is a driven roller.

The heating portion 202 has a pair of heating rollers 204, and can apply pressure while heating the second web M8 between the heating rollers 204. With this heating and pressurization, in the second web M8, the resin P1 is melted, and the fibers are bonded to each other via the molten resin P1. As a result, the sheet S is formed. The sheet S is transported toward the cutting portion 21. One of the pair of heating rollers 204 is a main driving roller driven by operation of a motor (not shown), and the other is a driven roller.

On the downstream side of the sheet forming portion 20, the cutting portion 21 is disposed. The cutting portion 21 is a portion that performs the cutting step of cutting the sheet S. The cutting portion 21 includes a first cutter 211 and a second cutter 212.

The first cutter 211 cuts the sheet S in a direction intersecting the transport direction (x direction) of the sheet S, that is, in the y direction. As a result, it is possible to adjust the entire length (length along the x direction) of the sheet S to a desired size.

The second cutter 212 is disposed on the downstream side of the first cutter 211. The second cutter 212 cuts one edge portion located in the direction (y direction) intersecting the transport direction and the other end portion of the sheet S in a direction parallel to the transport direction. As a result, the width of the sheet S (length along the y direction) can be adjusted to a desired size.

By cutting the first cutter 211 and the second cutter 212 as described above, the sheet S having a desired size can be obtained. The sheet S is further transported to the downstream side and accumulated in the stock portion 22.

As described above, in the embodiment, the raw material supply portion 11 is configured to include the raw material supply device 1. As shown in FIG. 2, the raw material supply device 1 is provided with the shredding portion (shredder) 3 for shredding raw material M1 serving as used paper, a storage portion 4 for storing the aggregate M20 of the coarse crushed pieces (small pieces) M2 from which the raw material M1 is shred, a foreign material removing portion 5 for removing a metal piece MF serving as a foreign material attached to the coarse crushed pieces M2, a transport portion 6 for transporting the aggregate M20 (coarse crushed pieces M2), a loosening portion 7 for loosening the aggregate M20 (coarse crushed pieces M2), and a measuring portion 8 for measuring the weight of the aggregate M20 (coarse crushed pieces M2). Hereinafter, the configuration of each part will be described.

As shown in FIG. 3, the raw material supply device 1 is provided with the shredding portion 3 for shredding the used paper, that is, the raw material M1, to obtain the coarse crushed pieces M2 (small pieces). As a result, the raw material M1 has a size enough to be weighed by the measuring portion 8, and thus accurate weighing is performed. In addition, the raw material M1 has a size enough to be defibrated by the defibrating portion 13, and thus rapid and sufficient defibrating is performed. As a result, the sheet S becomes a high density sheet having a relatively high density of fibers, and thus the sheet S has excellent quality.

The shredding portion 3 is, for example, a shredder having a cross cut function, and includes a pair of rotary blades 31 disposed side by side in the y direction and rotating in a direction opposite to each other, and a drive unit 32 for rotationally driving each of the rotary blades 31. When the raw material M1 is inserted into the rotary blades 31 from the upper side (positive side in z direction) in a state where the pair of rotary blades 31 are rotating, so that the raw material M1 is coarsely crushed into multiple coarse crushed pieces M2. In addition, each of the coarse crushed pieces M2 falls downward.

The shredding portion 3 preferably has a cross cut function, and it is not limited thereto, and may have a straight cut function or a spiral cut function, for example.

In addition, the drive unit 32 is electrically connected to the control unit 28, and the rotation speed of each of the rotary blades 31 can be appropriately changed. As a result, for example, the shredding speed at the shredding portion 3 can be adjusted according to various conditions such as the size of the raw material M1 and the feeding amount of the raw material M1.

In addition, the shape and size of the coarse crushed pieces M2 are preferably suitable for measuring in the measuring portion 8 and the defibrating processing in the defibrating portion 13. For example, the shape and size are preferably small pieces having a side length of 100 mm or less, and more preferably small pieces of 10 mm or more and 70 mm or less.

In addition, the shredding portion 3 may be omitted. In this case, for example, the raw material M1 may be shred into pieces with scissors or torn by hands to form small pieces and put into the storage portion 4. In addition, in addition to the coarse crushed pieces M2 obtained by shredding the raw material M1 by the shredding portion 3, the aggregate M20 may also contain coarse crushed pieces M2 obtained by shredding the raw material M1 with scissors or torn by hands.

The storage portion 4 includes the housing 41 for storing the aggregate M20 therein, the rotor 42 rotatably provided in the housing 41, a drive unit 43 for rotationally driving the rotor 42, and a resistance member 44 fixedly provided in the housing 41.

As shown in FIG. 3, in the embodiment, the housing 41 is configured to include a substantially cylindrical body having a cylindrical side wall portion 411, a flat top plate portion 412 covering the upper side of the side wall portion 411, and a bottom plate portion (bottom portion) 413 covering the lower side of the side wall portion 411. In the housing 41, a storage tank (space) 414 for storing the coarse crushed pieces M2 (aggregate M20) is defined by the side wall portion 411, the top plate portion 412, and the bottom plate portion (bottom portion) 413. Each of the rotary blades 31 of the shredding portion 3 are also stored in the upper portion of the storage tank 414.

In the top plate portion 412, a slit-like insertion port 415 through which the raw material M1 is inserted into the storage tank 414 is formed to be opened. The raw material M1 inserted through the insertion port 415 is shred by the above-described shredding portion 3 to become coarse crushed pieces M2. The coarse crushed pieces M2 are temporarily stored in the storage tank 414.

At a position eccentric from the center of the bottom plate portion 413, a discharge port 416 for discharging the coarse crushed pieces M2 from the storage tank 414 is formed to be opened. Although the shape of the discharge port 416 is circular in plan view, it is not limited thereto, and it may be, for example, an elliptical shape, a polygonal shape, a gourd shape, or a combination thereof.

The average width of the minimum width and the maximum width (diameter $\phi D_{416}$ in the embodiment) of the discharge port 416 is preferably 3 times or more and 10 times or less, and more preferably 4 times or more and 8 times or less the length $L_{M2}$ (average) of the longest portion of each coarse crushed piece M2 (small pieces). As a result, each coarse crushed piece M2 can smoothly pass through the discharge port 416 without forming a bridge. In addition, the coarse crushed pieces M2 can smoothly pass through the discharge port 416 even as the aggregate M20.

In addition, although the number of the discharge ports 416 to be formed is one in the embodiment, it is not limited thereto, and a plurality of discharge ports 416 may be formed.

As shown in FIG. 3, the rotor 42 is disposed in the center of the housing 41, that is, the bottom plate portion 413 side of the storage tank 414. As shown in FIG. 4, the rotor 42 is a table feeder that moves the coarse crushed pieces M2 (aggregate M20) in the housing 41 by rotating clockwise in the drawing arrow $\alpha_{42}$ direction). As a result, for example, it is possible to smoothly transfer the aggregate M20 to the discharge port 416 by agitating, loosening, or diffusing the aggregate M20.

The rotor 42 includes a columnar base portion 421 arranged concentrically with the rotation center $O_{42}$ of the rotor 42 and a plurality of protruding portions 422 radially extending from the base portion 421 (rotation center $O_{42}$ of rotor 42). As a result, when the rotor 42 rotates, each of the protruding portions 422 comes into contact with the aggregate M20, so that the aggregate M20 can be stably transferred to the discharge port 416.

The plurality of protruding portions 422 are arranged at equal angular intervals around the rotation center $O_{42}$. In addition, although the number of arrangement of the protruding portions 422 is four in the configuration shown in FIGS. 4 and 5, it is not limited thereto, and may be two, three, or five or more, for example.

In addition, although each of the protruding portions 422 has a straight shape in plan view, it is not limited thereto, and may be accurately curved, for example. In a case where each of the protruding portions 422 has a bow shape in plan view, each of the protruding portions 422 may be projected or may be recessed toward the traveling direction of the rotor 42 during rotation.

In addition, although the cross-sectional shape of each of the protruding portions 422 is a quadrangle (rectangle), it is not limited thereto, and it may be, for example, another polygonal shape, a circular shape or an elliptic shape.

In this manner, the storage portion 4 has the rotor 42 rotatably provided in the storage tank 414. As a result, it is possible to bring the aggregate M20 into a state of stably transferring to the discharge port 416 in the storage tank 414.

In addition, as shown in FIGS. 3 to 5, the discharge port 416 is provided at a position eccentric from the rotation center $O_{42}$ of the rotor 42, particularly at a position close to the side wall portion 411. Each of the coarse crushed pieces M2 can rotate with the rotor 42, so that centrifugal force acts on each of the coarse crushed pieces M2. Therefore, when the discharge port 416 is provided at the position as described above, each of the coarse crushed pieces M2 can easily reach the discharge port 416.

The drive unit 43 rotationally drives the rotor 42. The drive unit 43 is electrically connected to the control unit 28, and can appropriately change the rotation speed of the rotor 42. As a result, for example, the rotation speed of the rotor 42 can be adjusted according to various conditions such as the size of the coarse crushed pieces M2 and the amount (volume) of the aggregate M20. The rotation speed of the rotor 42 is not particularly limited, and is preferably 2.5 rpm or more and 10 rpm or less, for example.

Incidentally, depending on various conditions such as the rotation speed of the rotor 42 and the amount (volume) of the aggregate M20 in the housing 41, there is a possibility that a phenomenon called "co-rotation" in which the aggregate M20 is entangled with the protruding portion 422 of the rotor 42 and rotates with the rotor 42 may occur. When the co-rotation occurs, the aggregate M20 is not discharged from the discharge port 416, or even if the aggregate M20 is discharged, the discharge amount thereof is extremely small. As a result, the supply amount of the discharge port 416 to the downstream side varies, making it difficult to maintain the supply amount constant.

Therefore, the raw material supply device 1 (sheet manufacturing apparatus 100) is configured to prevent such a state from occurring. Hereinafter, this configuration and operation will be described.

As shown in FIG. 4, two resistive members 44 are disposed in the housing 41. Each of the resistance members 44 serve as resistances of the coarse crushed pieces M2 moving in the housing 41 by the rotation of the rotor 42. As a result, even if the aggregate M20 is entangled with the protruding portion 422 of the rotor 42, each of the resistance members 44 comes into contact (collides) with the entangled aggregate M20, and the entanglement of the aggregate M20 can be rapidly broken, that is, eliminated (refer to FIGS. 3 and 4). As a result, it is possible to prevent the co-rotation, so that the aggregate M20 is discharged from the discharge port 416 without excess or deficiency. By such discharging, when the coarse crushed pieces M2 are supplied to the downstream side, the supply amount can be maintained constant and stable to a desired amount.

Although the number of arrangement of the resistance members 44 is two in the configuration shown in FIG. 4, it is not limited thereto, and may be one, three or more, for example.

As shown in FIG. 4, the two resistance members 44 include a first resistance member 44a having a function of guiding the coarse crushed pieces M2 (small pieces) toward the discharge port 416. The first resistance member 44a has an elongated shape linearly extending in a direction intersecting the protruding direction of the protruding portion 422 when overlapping with the protruding portion 422 in plan view of the bottom plate portion (bottom portion) 413. In addition, one end portion 441 of the first resistance member 44a is positioned in the vicinity of the negative side in the y direction of the discharge port 416, and the other end portion 442 is positioned further beyond the rotation center $O_{42}$ of the rotor 42 on the positive side in the x direction.

During the rotation of the rotor 42, in the aggregate M20 in which the entangled state is eliminated, the coarse crushed piece M2 included therein is guided along the arrow $\alpha_{44a}$ direction from the other end portion 442 side to the one end portion 441 side of the first resistance member 44a, finally reaching the discharge port 416 (refer to FIG. 4). As a result, it is possible to discharge the aggregate M20 from the discharge port 416 without excess or deficiency.

An extension line of the first resistance member 44a on the side of the one end portion 441 may intersect the discharge port 416.

In addition, the two resistance members 44 include a second resistance member 44b that guides the coarse crushed pieces M2 (small pieces) that could not be discharged from the discharge port 416 toward the outside from the rotation center $O_{42}$ of the rotor 42. The second resistance member 44b has an elongated shape linearly extending in a direction intersecting the protruding direction of the protruding portion 422 when overlapping with the protruding portion 422 in plan view of the bottom plate portion (bottom portion) 413. In addition, one end portion 441 of the second resistance member 44b is positioned in the vicinity of the positive side in the y direction of the discharge port 416, and the other end portion 442 is positioned further beyond the rotation center $O_{42}$ of the rotor 42 on the positive side in the x direction.

As described above, the coarse crushed pieces M2 included in the aggregate M20 reaches the discharge port 416 by the first resistance member 44a, and may remain on the bottom plate portion 413 as it is across the discharge port 416. In this case, the coarse crushed pieces M2 are guided outward from the rotation center $O_{42}$ of the rotor 42, that is, along the arrow $\alpha_{44b}$ direction from the one end portion 441 side to the other end portion 442 side of the second resistance member 44b (refer to FIG. 4). Thereafter, the coarse crushed pieces M2 reach the discharge port 416 again along the inner peripheral portion of the side wall portion 411 of the housing 41 in the same manner as described above. As a result, the coarse crushed pieces M2 have an opportunity to be discharged from the discharge port 416.

Although each of the resistance members 44 has a straight shape in plan view, it is not limited thereto, and at least a portion thereof may be curved or bent, for example.

As described above, the housing 41 has a bottom plate portion (bottom portion) 413 that defines the storage tank 414. In addition, the rotor 42 is disposed on the side of the bottom plate portion (bottom portion) 413. As shown in FIG. 3, the first resistance member 44a and the second resistance member 44b are disposed between the protruding portion 422 of the rotor 42 and the bottom plate portion (bottom portion) 413, and are preferably fixed to the bottom plate portion 413 in particular. The coarse crushed pieces M2 are likely to accumulate on the bottom plate portion 413. Such coarse crushed pieces M2 can be stably guided in the direction of arrow $\alpha_{44a}$ by the first resistance member 44a or stably guided in the direction of arrow $\alpha_{44b}$ by the second resistance member 44b.

Although it is preferable that each of the resistance members 44 be fixedly provided in the housing 41, it is not limited thereto, and at least one resistance member 44 may be provided so that a posture (orientation) can be adjusted, for example.

In addition, the height $H_{44}$ of each of the resistance members 44 is preferably ½ or less of a separation distance $H_{422}$ between the protruding portion 422 of the rotor 42 and the bottom plate portion (bottom portion) 413, and more preferably 1/10 or more and ½ or less (refer to FIG. 3). As a result, even when the rotor 42 rotates, each of the resistance members 44 can sufficiently apply resistance to the coarse crushed pieces M2 while preventing interference of each of the protruding portions 422 regardless of the positions of each of the protruding portions 422.

In addition, although the height $H_{44}$ of each of the resistance members 44 is constant along the longitudinal direction of the resistance member 44 (refer to FIG. 3), it is not limited thereto, and the height $H_{44}$ may have a changed portion, for example.

In addition, although the width $W_{44}$ of each of the resistance members 44 is constant along the longitudinal direction of the resistance member 44 (refer to FIG. 4), it is not limited thereto, and the width $W_{44}$ may have a changed portion, for example.

As described above, in the embodiment, the raw material M1 to be recycled as the sheet S is, for example, the used paper printed and used. A binding member made of metal such as a stapler, a clip may be attached to the used paper. In this case, the used paper is coarsely crushed by the shredding portion 3 with the binding member. When the binding member is coarsely crushed, the binding member becomes a metal piece MF and is transported to the downstream side with the coarse crushed pieces M2 (refer to FIG. 2). When manufacturing the sheet S from the raw material M1, it is preferable that the metal piece MF be a foreign material and is in a removed state. The reason is that, for example, since the metal piece MF has a higher specific gravity than the coarse crushed pieces M2, in a case where the metal piece MF is mixed in the coarse crushed pieces M2, there is a possibility that the metal piece MF may affect the measurement of the weight of the coarse crushed pieces M2 in the measuring portion 8. In addition, by removing the metal piece MF, for example, it is possible to prevent the defibrating portion 13 and other portions after the defibrating portion 13 from being damaged by the metal piece MF. In addition, the metal piece MF which becomes a foreign material at the time of manufacturing is removed from the sheet S, thereby improving the quality.

The foreign material removing portion 5 is for removing the metal piece MF serving as a foreign material attached to the coarse crushed pieces M2. The "metal piece MF" includes, for example, a powdery piece, a particulate piece, a massive piece, a small piece-like piece, and the like.

As shown in FIG. 3, the foreign material removing portion 5 is provided with a passage route 51 communicating with the discharge port 416 and through which the aggregate M20 of the coarse crushed pieces M2 (small pieces) pass toward the transport portion 6, and a magnet 52 for adsorbing the metal piece MF mixed in the aggregate M20.

In the embodiment, the magnet 52 is provided on the downstream side of the discharge port 416, and it may be provided in the discharge port 416. In addition, the magnet 52 may be further provided in the storage tank 414.

In addition, the arrangement position of the magnet 52 is preferably in the range of 0 mm or more and 400 mm or less, and more preferably in the range of 0 mm or more and 250 mm or less, downward from the discharge port 416.

The passage route 51 is configured to include a lumen portion of a cylindrical body 53 having air permeability. The cylindrical body 53 is a mesh body having a plurality of through-holes 531 formed therein. As a result, when the aggregate M20 passes through the inside of the cylindrical body 53, a contact area between the aggregate M20 and the cylindrical body 53 can be suppressed as much as possible. Furthermore, by feeding the humidified air into the lumen part, it is possible to prevent or suppress generation of static electricity due to the contact. As a result, it is possible to prevent the coarse crushed pieces M2 from adhering to the cylindrical body 53 and staying thereto, so that it contributes to the fixed supply of the coarse crushed pieces M2.

In addition, the upper end portion of the cylindrical body 53 is connected to the bottom plate portion 413 of the housing 41 and protrudes downward.

As shown in FIG. 7, in the embodiment, the magnet 52 is configured to include a plurality of rod-shaped permanent magnets, that is, bar magnets. As a result, a plurality of magnetic poles are formed, and the metal piece MF can be adsorbed efficiently. In addition, for example, compared to an electromagnet that temporarily generates a magnetic force by energizing, the configuration of the magnet 52 can be simplified. The magnet 52 may be made of an electromagnet.

The permanent magnet constituting the magnet 52 is not particularly limited, and an alloy magnet, a ferrite magnet, a rare earth magnet, or the like can be used, for example. There are no particular restrictions on the alloy magnet, and examples thereof include Fe—Al—Ni—Co magnet (iron-aluminum-nickel-cobalt magnet: Alnico magnet), Fe—Cr—Co magnet (iron-chromium-cobalt magnet), and the like. The ferrite magnet is not particularly limited, and examples thereof include hard ferrite (ceramic magnet), and the like. The rare earth magnet is not particularly limited, and examples thereof include Sm—Co magnet (samarium-cobalt magnet) and ND-Fe—B magnet (neodymium-iron-boron magnet: neodymium magnet), and the like. In addition, the magnet 52 may be in any form such as a bonded magnet, a sintered magnet, a powder compact magnet, and the like.

The shape of the magnet 52 is not limited to a bar shape, and may be any shape such as a plate shape, a ring shape, and the like.

The magnetic flux density on the surface of the magnet 52 is not particularly limited, is preferably 8,000 G or more and 15,000 G or less, and more preferably 10,000 G or more and 13,000 G or less, for example.

As described above, the foreign material removing portion 5 (raw material supply device 1) is provided with the passage route 51 communicating with the discharge port 416 and through which the coarse crushed pieces M2 (small pieces) pass. As shown in FIG. 7, at least one pair (three pairs in the illustrated configuration) of magnets 52 is disposed on one side and the other side, that is, on sides opposite to each other, via the passage route 51. As a result, when the metal piece MF passes through the passage route 51 with the coarse crushed pieces M2, the metal piece MF can be attracted to the poles of one of the magnets 52 and can be adsorbed as it is (refer to FIG. 6). As a result, the coarse crushed pieces M2 (aggregate M20) flow downward in a state where mixing of the metal piece MF is prevented, and thus it is possible to prevent influence of the metal piece MF on the measurement of the weight of the coarse crushed pieces M2 in the measuring portion 8. As a result, the weight of the coarse crushed pieces M2 can be accurately measured, and thus the supply amount at the time of supplying the coarse crushed pieces M2 can be maintained constant to a desired amount. In addition, by removing the metal piece MF, it is possible to prevent the transport portion 6, the loosening portion 7, the measuring portion 8, and the like on the downstream side of the foreign material removing portion 5 from being damaged by the metal piece MF. In addition, the sheet S becomes a sheet from which the metal piece MF as a foreign material is removed, and the sheet S has excellent quality.

At least one pair of magnets 52 is disposed to face each other via the passage route 51, and it is not limited to such an arrangement. The magnets 52 may be arranged on the side opposite to each other, that is, may be arranged to be displaced from each other.

Hereinafter, in FIG. 7, one magnet unit 54 (upper side in FIG. 7) of the two magnet units 54 may be referred to as "first magnet unit 541", and the other magnet unit 54 (lower side in FIG. 7) may be referred to as "second magnet unit 542". In addition, in the first magnet unit 541, one pair of three magnets 52 is provided. Each of the magnets 52 in the first magnet unit 541 is referred to as "magnet 521", and the magnet 521 of these three may be referred to as "first magnet 52*a*", "second magnet 52*b*", and "third magnet 52*c*" in order from the left side. In addition, in the second magnet unit 542, one pair of three magnets 52 is provided. Each of the magnets 52 in the second magnet unit 542 is referred to as "magnet 522", and the magnet 522 of these three may be referred to as "first magnet 52*d*", "second magnet 52*e*", and "third magnet 52*f*" in order from the left side. Although the number of pairs of the magnets 52 is three in the embodiment, it is not limited thereto, and one pair, two pairs, or four or more pairs may be used, for example.

In addition, the foreign material removing portion 5 (raw material supply device 1) is provided with the passage route 51 communicating with the discharge port 416 and through which the coarse crushed pieces M2 (small pieces) pass toward the transport portion 6. In this passage route 51, the coarse crushed pieces M2 (small pieces) can freely fall. As a result, the falling speed in the passage route 51 is suppressed as much as possible as compared with the case where the coarse crushed pieces M2 are forcibly sucked downward and fell, for example. As a result, it is possible to ensure the time during which the coarse crushed pieces M2 pass in front of the magnet 52 as long as possible, and thus the adsorption of the coarse crushed pieces M2 by the magnet 52 can be sufficiently performed.

In addition, at least one pair of magnets 521 and 522 of the magnet 52 have different poles facing each other. As shown in FIG. 7, in the embodiment, the first magnet 52*a* of the first magnet unit 541 and the first magnet 52*d* of the second magnet unit 542 have different poles facing each other. In addition, the second magnet 52*b* of the first magnet unit 541 and the second magnet 52*e* of the second magnet unit 542 have different poles facing each other. The third magnet 52*c* of the first magnet unit 541 and the third magnet 52*f* of the second magnet unit 542 have different poles facing each other. As a result, it is possible to regulate the direction of the magnetic lines of force in the passage route 51, and thus the attracting force to the metal piece MF increases. It is possible to adsorb and capture the metal piece MF sufficiently regardless of the magnitude of the passage of the metal piece MF passing between the magnets 52. Among the three pairs of magnets 52, those having the same poles facing each other may be present.

In addition, as shown in FIG. 5, at least one pair of magnets 52 (in the embodiment, each pair in the same manner as described above) is disposed side by side in the rotation direction of the rotor 42 (tangential direction on discharge port 416 (y direction)) (hereinafter, this arrangement will be referred to as "parallel arrangement"). As shown in FIG. 6, the metal piece MF is discharged with the coarse crushed pieces M2 from the discharge port 416 from the upper right to the lower left in the drawing by the rotation of the rotor 42. Due to the parallel arrangement of the magnets 52 in each pair, the metal piece MF is likely to be attracted to the magnet 52 as close as possible among the each pairs of magnets 52. As a result, an adsorption rate with respect to the metal piece MF can be improved.

As shown in FIG. 7, the magnets 52 form the magnet unit 54 in which the plurality of magnets 52 are linearly arranged. In the embodiment, in the magnet unit 54, three magnets 52 are linearly arranged along the x direction. As a result, it is possible to ensure a wide range in which the attraction force of the magnet unit 54 against the metal piece MF reaches. Therefore, the metal piece MF is rapidly adsorbed by the magnet unit 54 regardless of the passage position in the passage route 51. The number of magnets 52 forming the magnet unit 54 is not limited to three, and may be two or four or more, for example.

In the magnet unit 54, the same poles of the plurality of magnets 52 are adjacent to each other. As a result, for example, the density of magnetic lines of force on the surface of each magnet unit 54 can be increased, and thus the adsorption force against the metal piece MF between the magnet units 54 increases.

The magnet unit 54 has a cylindrical case 55 that collectively stores the three magnets 52. That is, the first magnet unit 541 has a cylindrical case 551 that collectively stores three magnets 521 (first magnet 52a, second magnet 52b, and third magnet 52c). The second magnet unit 542 has a cylindrical case 552 that collectively stores the three magnets 522 (first magnet 52d, second magnet 52e, and third magnet 52f). As a result, it is possible to maintain the state where the three magnets 52 are linearly arranged. As the constituent material of the case 55, a so-called nonmagnetic material having strength enough to withstand the repulsive force of the magnet 52 is preferable. For example, stainless steel such as SUS 305 or aluminum can be used.

In addition, the magnet unit 54 is supported at both ends by a magnet unit support portion 417 provided so as to protrude from the bottom plate portion 413 of the housing 41. The constituent material of the magnet unit support portion 417 is not particularly limited, and austenitic stainless steel such as SUS 304 or the like can be used, for example.

In addition, in a case where the bottom plate portion 413 of the housing 41 is made of a magnetic material, the magnetic force from the magnet unit 54 is also applied to the edge portion of the discharge port 416 formed in the bottom plate portion 413 so that the metal piece MF can be adsorbed also on the edge portion.

As shown in FIG. 2, the raw material supply device 1 is provided with the transport portion 6 provided on the downstream side of the passage route 51 and forcedly transporting the coarse crushed pieces M2 (small pieces) accumulated thereon. As a result, the coarse crushed pieces M2 (aggregate M20) discharged from the discharge port 416 can be transported toward the measuring portion 8.

The transport portion 6 is a vibration feeder having a placing portion (trough) 61 on which the coarse crushed pieces M2 are placed and a vibration applying portion 62 for applying vibration to the coarse crushed pieces M2 with the placing portion 61 in a state where the coarse crushed pieces M2 are placed on the placing portion 61.

As shown in FIG. 3, the placing portion 61 has a tray shape including the bottom plate portion 611 and the side wall portion 612 erected from the bottom plate portion 611.

The bottom plate portion 611 is a plate-like portion extending along the x direction. The coarse crushed pieces M2 can be accumulated on the bottom plate portion 611.

The side wall portion 612 encloses the negative side in the x direction and the positive and negative sides in the y direction of the bottom plate portion 611. As a result, it is possible to prevent the coarse crushed pieces M2 accumulated on the bottom plate portion 611 from being protruded, and thus it is possible to stably transport the coarse crushed pieces M2. In this manner, the portion surrounded by the bottom plate portion 611 and the side wall portion 612 becomes a transport path 63 through which the coarse crushed pieces M2 are transported.

As described above, the transport portion 6 has a vibration applying portion 62 applying vibration to the coarse crushed pieces M2 (small pieces). The transport portion 6 quantitatively transports the coarse crushed pieces M2 (small pieces) on the bottom plate portion 611 by vibrations from the vibration applying portion 62. As a result, for example, the configuration of the transport portion 6 can be simplified as compared with a case where the transport portion 6 can be transported by a belt.

The transport portion 6 may transport the coarse crushed pieces M2 on a belt, slide the coarse crushed pieces M2 on the inclined surfaces, or transport the coarse crushed pieces M2 by air (air flow transport).

The vibration applying portion 62 is disposed below the placing portion 61 and is in contact with a middle portion of the bottom plate portion 611 in the longitudinal direction. The vibration applying portion 62 is not particularly limited. For example, a force is generated by passing an electric current through a conductor crossing the magnetic field, and it is possible to use one configured to vibrate the vibrator by this force (exciting force). Alternatively, it is possible to use one configured to vibrate by a force (exciting force) due to an electromagnet by passing an electric current through the coil.

In addition, it is preferable that the vibration applying portion 62 be configured to have variable frequency. As a result, the frequency can be adjusted according to various conditions such as the size of the coarse crushed pieces M2, so that the coarse crushed pieces M2 can be transported rapidly and smoothly.

In this manner, in the raw material supply device 1, the measuring portion 8 can be disposed apart from the vibration applying portion 62 of the transport portion 6. As a result, it is possible to prevent the vibration generated when the transport portion 6 is operated from being transmitted to the measuring portion 8, that is, it is possible to prevent the measuring portion 8 from being influenced by vibration at the time of weighing the aggregate M20. As a result, the weight of the coarse crushed pieces M2 can be accurately measured by the measuring portion 8, and thus the supply amount at the time of supplying the coarse crushed pieces M2 can be maintained constant to a desired amount.

As shown in FIG. 3, when the distance between the discharge port 416 and the bottom plate portion 611 of the placing portion 61 where the coarse crushed pieces (small pieces) M2 land on the transport portion 6 and transport of the coarse crushed pieces (small pieces) M2 is started, along the vertical line with the discharge port 416 with reference to the imaginary plane connecting the outer walls of the bottom plate portion 413 of the housing 41 is H ($H_{613}$ in the embodiment), and the average width of the minimum width and the maximum width of the discharge port 416 is W (diameter $\phi D_{416}$ in the embodiment), it is preferable that the relationship of H≥W ($H_{613} \geq \phi D_{416}$ in the embodiment) be satisfied. Furthermore, it is more preferable that the relationship of 400 mm≥H≥W (400 mm≥$H_{613} \geq \phi D_{416}$ in the embodiment) be satisfied.

In addition, the distance $H_{613}$ between the bottom plate portion 611 of the placing portion 61 and the discharge port 416 is preferably 400 mm or less, and more preferably 250 mm or more and 400 mm or less.

By satisfying such a condition, for example, it is possible to prevent multiple coarse crushed pieces M2 from being connected from the discharge port 416 to the bottom plate portion 611 and becoming a mass (aggregate M20) in which the coarse crushed pieces M2 are entangled with each other. As a result, the aggregate M20 can be loosened without excess or deficiency by the loosening portion 7 formed on the downstream side of the bottom plate portion 611.

As shown in FIG. 3, the loosening portion 7 is disposed in the transport direction of the transport portion 6. The loosening portion 7 loosens the aggregate M20 being transported by the transport portion 6. This loosening effect contributes to maintaining the supply amount constant to a desired amount when the aggregate M20 is supplied.

The loosening portion 7 is provided with the rotor 71 having a rotating shaft 711 and the drive unit 72 rotating the rotor 71 around the rotating shaft 711 in a direction intersecting with the transport direction (x direction) of the transport portion 6 (in particular, orthogonal y direction is preferable).

The rotor 71 includes a plurality of blades 712 loosening the aggregate M20 by contacting the aggregate M20 when rotated in the direction of the arrow $\alpha_{71}$ around the rotating shaft 711. The blades 712 are arranged at equal intervals around the rotating shaft 711. As a result, when the rotor 71 rotates, each blade 712 can regularly collide with the aggregate M20, and thus it is possible to sufficiently loosen the aggregate M20 with the transport of the aggregate M20.

In addition, the rotor 71 can be rotated by the operation of the drive unit 72 so that the blade 712 comes into contact with the aggregate M20 from the downstream side in the transport direction (positive side in x direction). As a result, the loosening effect on the aggregate M20 can be improved.

The drive unit 72 rotationally drives the rotor 71. The drive unit 72 is electrically connected to the control unit 28, and the rotation speed of the rotor 71 can be appropriately changed. As a result, for example, the rotation speed of the rotor 71 can be adjusted according to various conditions such as the size of the coarse crushed pieces M2 and the amount (volumes) of the aggregate M20. In addition, the drive unit 72 can rotate the rotor 71 in the direction opposite to the direction of the arrow $\alpha_{71}$.

As shown in FIG. 2, the raw material supply device 1 is provided on the downstream side in the transport direction of the transport portion 6, and is provided with the measuring portion 8 for measuring the coarse crushed pieces (small pieces) M2. As a result, it can contribute to maintaining the supply amount constant to a desired amount when the aggregate M20 is supplied.

The measuring portion 8 includes an accommodation portion 81 for accommodating the aggregate M20 and a load transducer 82 for converting the weight of the aggregate M20 accommodated in the accommodation portion 81 into an electric signal. The load transducer 82 is a device commonly referred to as a "load cell". As a result, the weight of the aggregate M20 can be accurately measured.

The accommodation portion 81 is configured to include two divisible (separable) division halves 811, and is formed into a box shape in a state where these two division halves 811 are assembled (in a state of being close to each other). The accommodation portion 81 is in a box shape and includes an introduction port 812 into which the aggregate M20 is introduced on an upper portion thereof.

In addition, the accommodation portion 81 includes a bottom portion 813 that can be opened and closed by the division halves 811 approaching and separating from each other. The accommodation portion 81 accommodates the aggregate M20 when the bottom portion 813 is in the closed state and discharges the aggregate M20 when the bottom portion 813 is in the open state. The aggregate M20 discharged from the accommodation portion 81 can flow into the pipe 241 and flow downward toward the downstream side. Thereafter, the aggregate M20 is provided as a material of the sheet S as described above.

Second Embodiment

Figure 8:
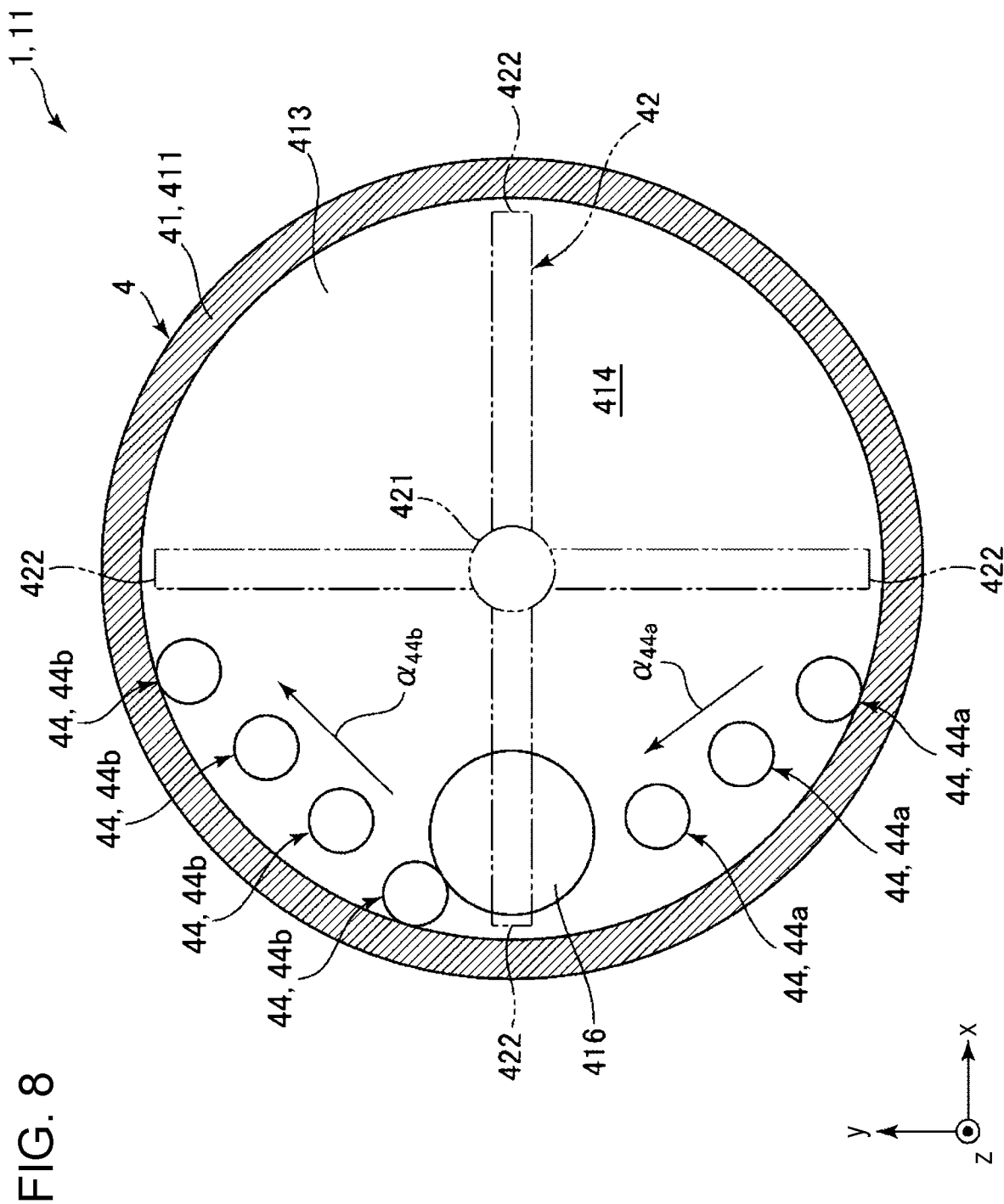
FIG. 8 is a horizontal cross-sectional view showing a configuration on an upstream side of a raw material supply device provided in a sheet manufacturing apparatus (second embodiment) of the invention.

FIG. 8 is a horizontal cross-sectional view showing a configuration on an upstream side of a raw material supply device provided in a sheet manufacturing apparatus (second embodiment) of the invention.

Hereinafter, a second embodiment of the raw material supply device and the sheet manufacturing apparatus of the invention will be described with reference to the drawing, the differences from the above-described embodiment will be mainly described, and description of similar matters will be omitted.

This embodiment is the same as the first embodiment except that the configurations of the resistance member are different from that of the first embodiment.

As shown in FIG. 8, in the embodiment, each of the resistance members 44 has a columnar shape protruding from the bottom plate portion 413 of the housing 41 in the z direction. As a result, when the coarse crushed pieces M2 move during the rotation of the rotor 42, it is possible to sufficiently apply resistance to the coarse crushed pieces M2.

In addition, among these resistance members 44, the first resistance members 44a are arranged with a space on a straight line in plan view. As a result, the coarse crushed pieces M2 can be guided toward the discharge port 416, that is, along the direction of the arrow $A_{44a}$.

In addition, the second resistance members 44b are also arranged with a space on a straight line on the side opposite thereto via the discharge port 416 in plan view. As a result, the coarse crushed pieces M2 can be guided toward the outside, that is, along the direction of the arrow $\alpha_{44b}$.

Although each of the resistance members 44 has a columnar shape in the embodiment, it is not limited thereto, and may have a square column shape, for example.

Third Embodiment

Figure 9:
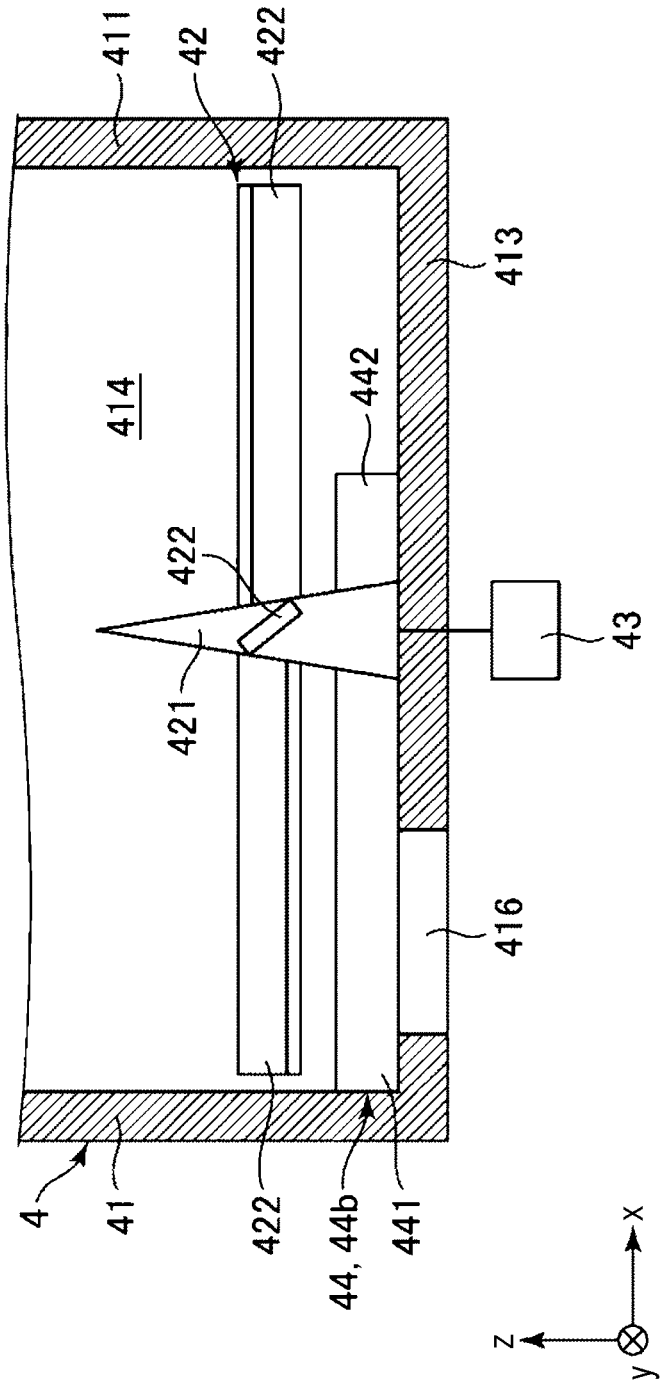
FIG. 9 is a partial vertical cross-sectional view showing a configuration on an upstream side of a raw material supply device provided in a sheet manufacturing apparatus (third embodiment) of the invention.

FIG. 9 is a partial vertical cross-sectional view showing a configuration on an upstream side of a raw material supply device provided in a sheet manufacturing apparatus (third embodiment) of the invention.

Hereinafter, a third embodiment of the raw material supply device and the sheet manufacturing apparatus of the invention will be described with reference to the drawing, the differences from the above-described embodiment will be mainly described, and description of similar matters will be omitted.

This embodiment is the same as the first embodiment except that the shape of the protruding portion of the rotor is different from that of the first embodiment.

As shown in FIG. 9, in the embodiment, each protruding portion 422 of the rotor 42 has a long plate shape. In addition, each protruding portion 422 is inclined with respect to the bottom plate portion 413 of the housing 41. With the rotor 42 having such a configuration, for example, agitation, loosening, and diffusion with respect to the aggregate M20 can be promoted, and thus it is possible to smoothly transfer the aggregate M20 to the discharge port 416.

Fourth Embodiment

Figure 10:
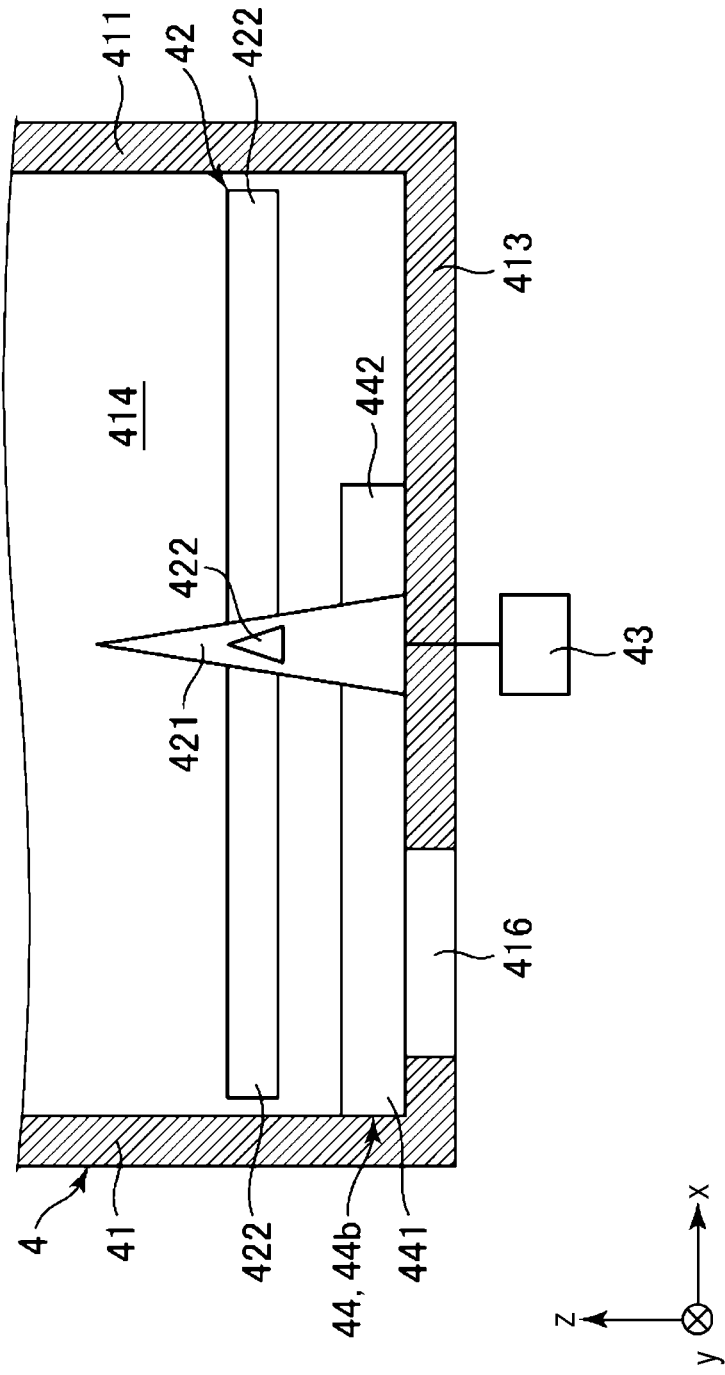
FIG. 10 is a partial vertical cross-sectional view showing a configuration on an upstream side of a raw material supply device provided in a sheet manufacturing apparatus (fourth embodiment) of the invention.

FIG. 10 is a partial vertical cross-sectional view showing a configuration on an upstream side of a raw material supply device provided in a sheet manufacturing apparatus (fourth embodiment) of the invention.

Hereinafter, a fourth embodiment of the raw material supply device and the sheet manufacturing apparatus of the invention will be described with reference to the drawing, the differences from the above-described embodiment will be mainly described, and description of similar matters will be omitted.

This embodiment is the same as the third embodiment except that the shape of the protruding portion of the rotor is different from that of the first embodiment.

As shown in FIG. 10, in the embodiment, the transverse sectional shape of each protruding portion 422 of the rotor 42 is triangular. With the rotor 42 having such a configuration, for example, agitation, loosening, and diffusion with respect to the aggregate M20 can be promoted, and thus it is possible to smoothly transfer the aggregate M20 to the discharge port 416.

Fifth Embodiment

Figure 11:
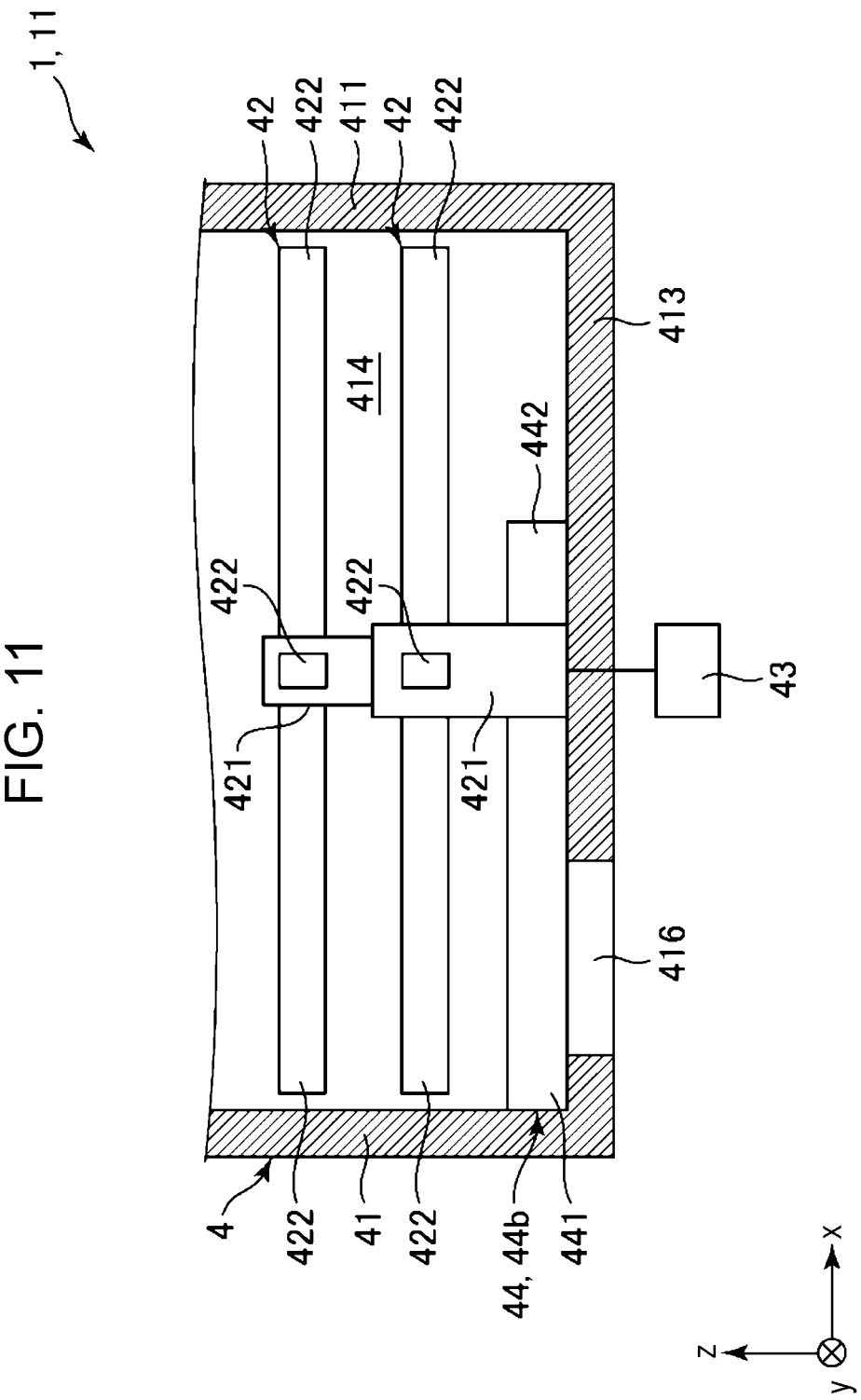
FIG. 11 is a partial vertical cross-sectional view showing a configuration on an upstream side of a raw material supply device provided in a sheet manufacturing apparatus (fifth embodiment) of the invention.

FIG. 11 is a partial vertical cross-sectional view showing a configuration on an upstream side of a raw material supply device provided in a sheet manufacturing apparatus (fifth embodiment) of the invention.

Hereinafter, a fifth embodiment of the raw material supply device and the sheet manufacturing apparatus of the invention will be described with reference to the drawing, the differences from the above-described embodiment will be mainly described, and description of similar matters will be omitted.

This embodiment is the same as the first embodiment except that the number of arrangement of the rotor is different from that of the first embodiment.

As shown in FIG. 11, in the embodiment, two rotors 42 are disposed coaxially (in z direction). Each of the rotors 42 can be rotationally driven independently by the drive unit 43. As a result, for example, according to the state of the aggregate M20, the following aspects can be adopted.

First, as Aspect 1, there is an aspect in which the two rotors 42 rotate in the same direction and the rotation speed thereof is also the same as each other.

As Aspect 2, there is an aspect in which the two rotors 42 rotate in the same direction, and the rotation speed thereof is different from each other.

As Aspect 3, there is an aspect in which the two rotors 42 rotate in a direction opposite to each other, and the rotation speed thereof is the same as each other.

As Aspect 4, there is an aspect in which the two rotors 42 rotate in a direction opposite to each other, and the rotation speed thereof is also different from each other.

As Aspect 5, there is an aspect in which one rotor 42 of the two rotors 42 rotates while the other rotor 42 stops. An aspect in which this rotation and stop are alternately switched may be adopted.

By switching the above aspects according to the state of the aggregate M20, it is possible to smoothly transfer the aggregate M20 to the discharge port 416.

Sixth Embodiment

Figure 12:
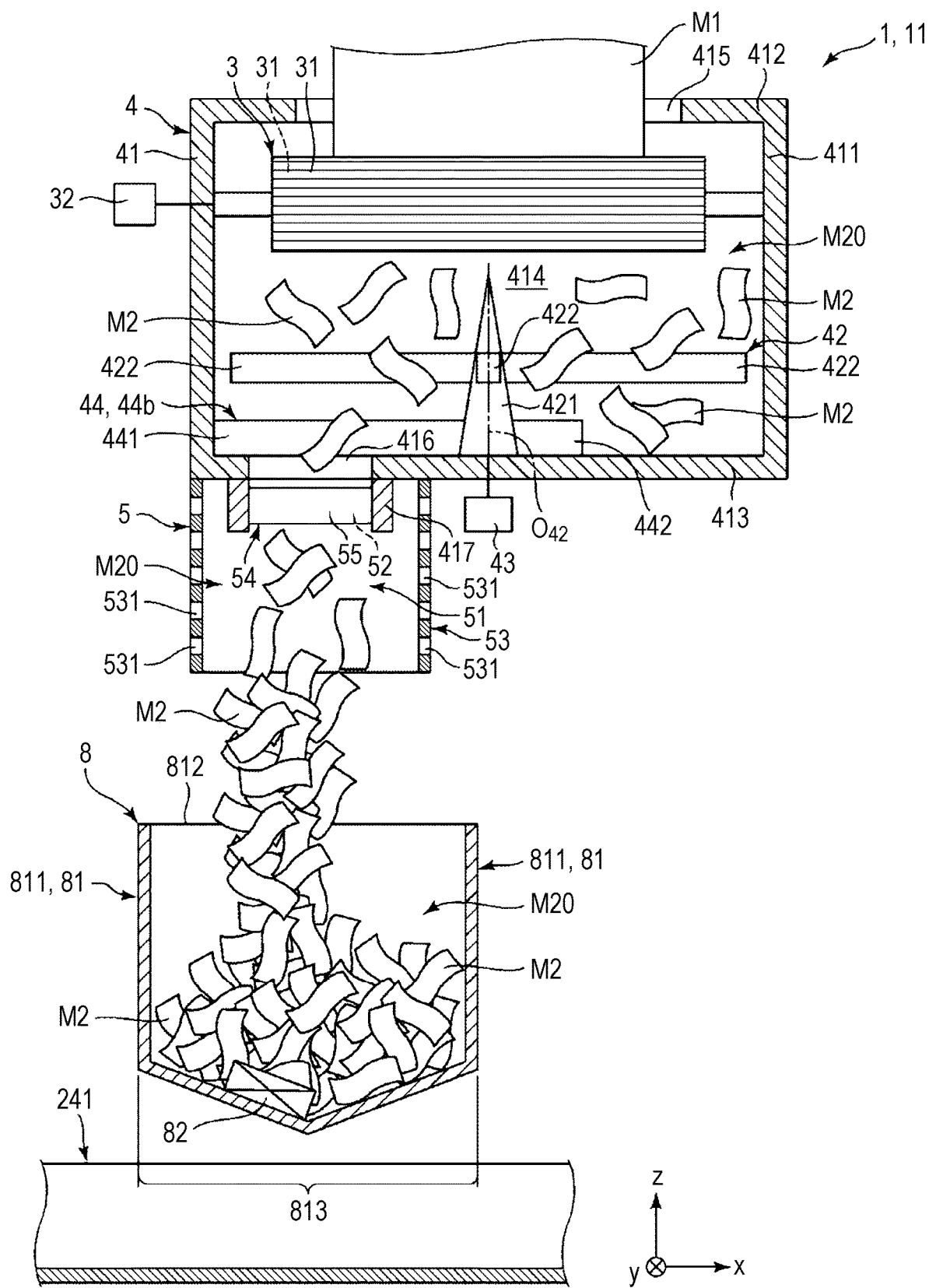
FIG. 12 is a partial vertical cross-sectional view showing a configuration on an upstream side of a raw material supply device provided in a sheet manufacturing apparatus (sixth embodiment) of the invention.
Figure 13:
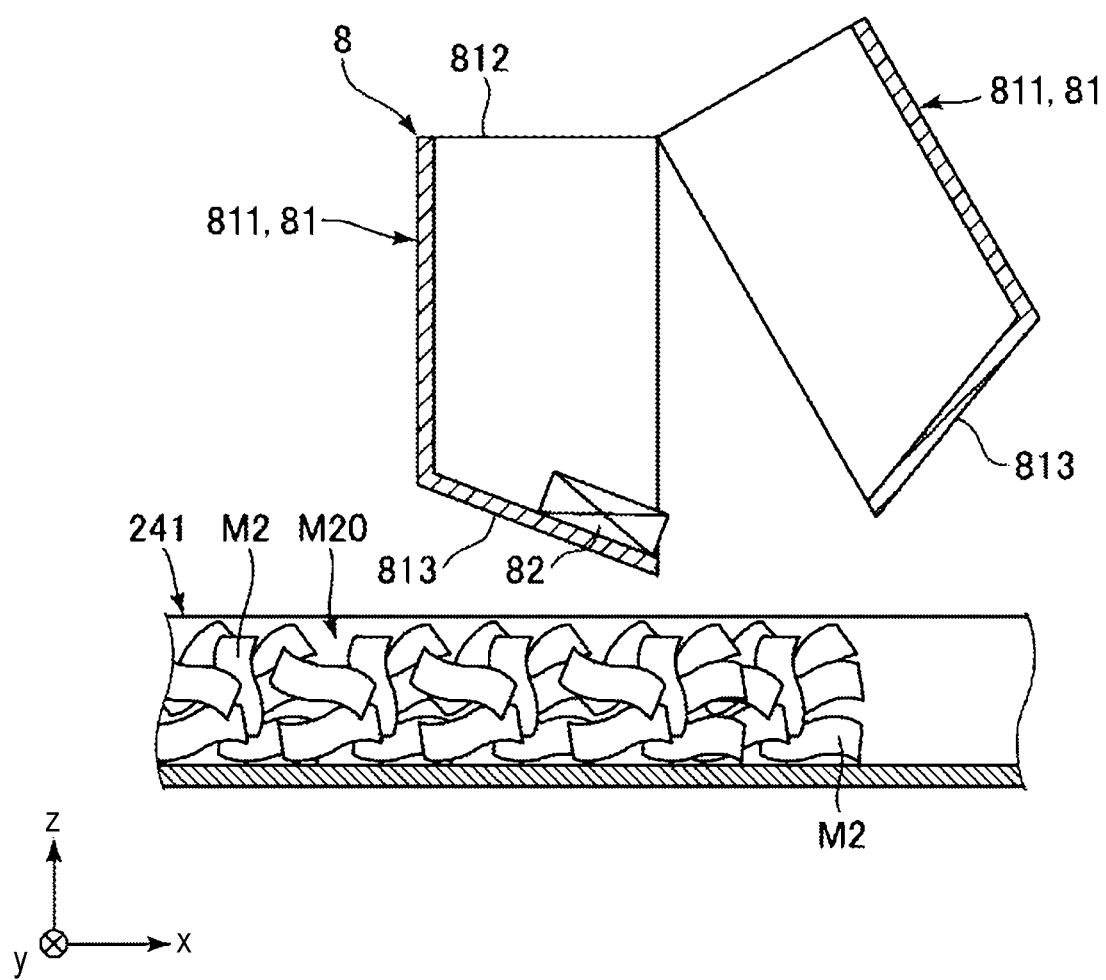
FIG. 13 is a partial vertical cross-sectional view showing the configuration on the upstream side of the raw material supply device provided in the sheet manufacturing apparatus (sixth embodiment) of the invention.

FIGS. 12 and 13 are partial vertical cross-sectional views showing a configuration on an upstream side of a raw material supply device provided in a sheet manufacturing apparatus (sixth embodiment) of the invention, respectively.

Hereinafter, a sixth embodiment of the raw material supply device and the sheet manufacturing apparatus of the invention will be described with reference to the drawing, the differences from the above-described embodiment will be mainly described, and description of similar matters will be omitted.

This embodiment is the same as the first embodiment except that the transport portion and the loosening portion are omitted.

As shown in FIG. 12, in the embodiment, in the raw material supply device 1, the transport portion 6 and the loosening portion 7 are omitted, and the accommodation portion 81 of the measuring portion 8 is disposed in the vertical downward direction of the passage route 51 (discharge port 416).

As shown in FIG. 13, the bottom portion 813 of the accommodation portion 81 can be opened and closed according to the weight of the coarse crushed pieces M2 accommodated in the accommodation portion 81. As a result, in a state where the mixing of the metal piece MF is reduced, the weight of the coarse crushed pieces M2 is measured and quantitative supply is possible. In addition, as compared with a case where the transport portion 6 can be transported by a belt, it is possible to reduce the size of the raw material supply device 1.

Hereinbefore, although the raw material supply device and the sheet manufacturing apparatus of the invention are described with reference to the illustrated embodiments, the invention is not limited thereto. Each portion forming the raw material supply device and the sheet manufacturing apparatus can be replaced with any configuration capable of exerting the same function. In addition, any components may be added.

In addition, the raw material supply device and the sheet manufacturing apparatus of the invention may be a combination of any two or more configurations (features) of each embodiment described above.

In addition, prior to the raw material being inserted into the insertion port of the housing of the storage portion, the raw material supply device may be provided with a raw material deforming portion which curves or bends the raw material. For example, in a case of a size that is hard to insert the raw material into the insertion port, the raw material can be curvedly deformed or bent and deformed by the raw material deforming portion so that the raw material can be easily inserted into the insertion port.

The entire disclosure of Japanese Patent Application No: 2018-35880, filed Feb. 28, 2018 is expressly incorporated by reference herein.

What is claimed is:

1. A raw material supply device comprising:
   a housing that stores an aggregate of small pieces;
   a discharge port through which the small pieces are discharged from an inside of the housing;
   a rotor provided in the housing and including a protruding portion;
   a magnet provided on the discharge port or on a downstream side of the discharge port; and
   a passage route that communicates with the discharge port and through which the small pieces pass, wherein
   at least one pair of the magnets is disposed on one side and the other side via the passage route, and
   the at least one pair of magnets is disposed side by side in a direction of rotation of the rotor.

2. The raw material supply device according to claim 1, wherein the at least one pair of magnets has different poles facing each other.

3. The raw material supply device according to claim 1, wherein the magnet forms a magnet unit in which a plurality of the magnets are linearly arranged.

4. The raw material supply device according to claim 3, wherein in the magnet unit, the same poles of the plurality of magnets are adjacent to each other.

5. The raw material supply device according to claim 1, further comprising:
a passage route that communicates with the discharge port and through which the small pieces pass,
wherein the small pieces freely fall in the passage route.

6. The raw material supply device according to claim 5, further comprising:
a transport portion provided on a downstream side of the passage route and that transports the small pieces accumulated thereon.

7. The raw material supply device according to claim 6, wherein the transport portion includes a vibration applying portion that applies vibration to the small pieces, and transports the small pieces by the vibration.

8. The raw material supply device according to claim 5, further comprising:
an accommodation portion having a bottom portion in a direction vertically downward of the discharge port,
wherein the bottom portion is capable of being opened and closed according to a weight of the small pieces accommodated in the accommodation portion.

9. The raw material supply device according to claim 1, wherein the discharge port is provided at a position eccentric from a rotation center of the rotor.

10. The raw material supply device according to claim 1, further comprising:
a shredding portion that shreds a used paper to obtain the small pieces.

11. A sheet manufacturing apparatus comprising:
the raw material supply device according to claim 1,
wherein a sheet is manufactured using the small pieces supplied from the raw material supply device as a raw material.

12. A raw material supply device comprising:
a housing that stores an aggregate of small pieces;
a discharge port through which the small pieces are discharged from an inside of the housing;
a rotor provided in the housing and including a protruding portion;
a magnet provided on the discharge port or on a downstream side of the discharge port;
a passage route that communicates with the discharge port and through which the small pieces pass; and
an accommodation portion having a bottom portion in a direction vertically downward of the discharge port, wherein
the small pieces freely fall in the passage route, and
the bottom portion is capable of being opened and closed according to a weight of the small pieces accommodated in the accommodation portion.

* * * * *